(12) United States Patent
Anderson et al.

(10) Patent No.: US 10,464,653 B2
(45) Date of Patent: Nov. 5, 2019

(54) NETWORKED ARCHITECTURE FOR A CONTROL SYSTEM FOR A STEERABLE THRUSTING DEVICE

(71) Applicants: Neil D. Anderson, Calumet, MI (US); Nels E. Benda, Hancock, MI (US); Travis M. White, Chassell, MI (US)

(72) Inventors: Neil D. Anderson, Calumet, MI (US); Nels E. Benda, Hancock, MI (US); Travis M. White, Chassell, MI (US)

( * ) Notice: Subject to any disclaimer, the term of this patent is extended or adjusted under 35 U.S.C. 154(b) by 0 days.

(21) Appl. No.: 14/800,560

(22) Filed: Jul. 15, 2015

(65) Prior Publication Data

US 2016/0016651 A1      Jan. 21, 2016

Related U.S. Application Data

(60) Provisional application No. 61/999,104, filed on Jul. 16, 2014.

(51) Int. Cl.
| | |
|---|---|
| *B60L 3/00* | (2019.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B63H 25/04* | (2006.01) |
| *G01C 21/20* | (2006.01) |

(Continued)

(52) U.S. Cl.
CPC ........... *B63H 25/04* (2013.01); *B63H 20/007* (2013.01); *G01C 21/203* (2013.01); *G01S 19/13* (2013.01); *G05D 1/0206* (2013.01); *H04L 67/02* (2013.01); *H04L 67/04* (2013.01); *H04L 67/10* (2013.01); *H04L 67/12* (2013.01); *H04L 67/18* (2013.01); *B63H 2025/045* (2013.01)

(58) Field of Classification Search
CPC ..................................................... B63H 25/04
See application file for complete search history.

(56) References Cited

U.S. PATENT DOCUMENTS

| | | |
|---|---|---|
| 5,386,368 A | 1/1995 | Knight |
| 5,491,636 A | 2/1996 | Robertson et al. |
| | (Continued) | |

OTHER PUBLICATIONS

Lowrance Press Release from Jul. 17, 2014.

*Primary Examiner* — Imran K Mustafa
(74) *Attorney, Agent, or Firm* — Device Patent LLC

(57) ABSTRACT

A control system for a steerable thrusting device is disclosed comprising a mobile device and application which interface with an electronic controller to command the output power and directional heading of the steerable thrusting device. In at least one embodiment, the mobile device serves the functions of a mapping and input device that communicates bi-directionally with a Global Navigation Satellite System (GNSS) and direction device-equipped electronic controller, which in turn controls the power and heading of the thrusting device on a marine vessel. Data can be stored on the mobile device or procured in real-time via network access to a dedicated database and communicated to the electronic controller in order to execute specific functions of the thrusting device control system. The data created in the control system is capable of being shared amongst similar devices via the use of a cloud network.

16 Claims, 35 Drawing Sheets

(51) Int. Cl.
*G01S 19/13* (2010.01)
*H04L 29/08* (2006.01)
*B63H 20/00* (2006.01)
*G05D 1/02* (2006.01)

(56) References Cited

U.S. PATENT DOCUMENTS

| | | |
|---|---|---|
| 5,884,213 A | 3/1999 | Carlson |
| 6,678,589 B2 | 1/2004 | Robertson et al. |
| 6,962,513 B2 | 11/2005 | Kimata et al. |
| 8,433,463 B1 | 4/2013 | Lieberman et al. |
| 8,527,192 B2 | 9/2013 | Grace et al. |
| 8,645,012 B2 | 2/2014 | Salmon et al. |
| 8,761,976 B2 | 6/2014 | Salmon et al. |
| 2005/0268834 A1* | 12/2005 | Koda .................... A63H 23/04 114/144 RE |
| 2006/0064242 A1* | 3/2006 | Litvack ................ G01C 21/203 701/410 |
| 2006/0089794 A1 | 4/2006 | DePasqua |
| 2009/0037040 A1 | 2/2009 | Salmon et al. |
| 2010/0185342 A1* | 7/2010 | Wubker, Jr. ......... G05D 1/0206 701/2 |
| 2012/0015566 A1 | 1/2012 | Salmon |
| 2013/0271301 A1* | 10/2013 | Kabel .................... B63B 49/00 340/987 |
| 2014/0277850 A1 | 9/2014 | Jobs et al. |

\* cited by examiner

B.0 – Initializations

J.0 - Heartbeat

C.0 – Acquire Sensor Data

D.0 – Footpedal Poll

E.0 – Manual

G.0 – Go-From

H.1 – Application Route Interface

G.1 – Heading Lock

I.2 – Turn Control

L.0 – Receive Command

N.0 – Application Sections

N.1 – Application Pages

N.4 – Cloud Access Process

A and C are Min Dist1
B and D are Min Dist2
Region E is Outside Region
Region F is Inside Region

NETWORKED ARCHITECTURE FOR A CONTROL SYSTEM FOR A STEERABLE THRUSTING DEVICE

CROSS REFERENCE TO RELATED APPLICATIONS

This application claims priority to Provisional Patent Application No. 61/999,104 filed Jul. 16, 2014, the entire disclosure of which is hereby incorporated by reference and relied upon.

BACKGROUND OF THE INVENTION

Field of the Invention

The invention relates generally to control systems, and more particularly to control systems for steerable thrusting devices.

Description of Related Art

Thrusting devices are utilized in a range of applications often requiring external control of both magnitude and direction of the thruster. For example, one form of thruster is an electric trolling motor, which is typically utilized on small to medium sized boats, approximately 24' in length or less, for fishing applications such as trolling, navigating and anchoring. All electric trolling motors utilize an electric motor with an attached propeller for propelling the boat. Electric trolling motors can either be mounted in the stern or bow of the boat. For best control of the boat and to point the bow of the boat into the wind or waves, it is preferred to have the trolling motor at the bow of the boat. When mounted at the bow, they are typically referred to as a bow mount trolling motor. A typical bow mount trolling motor system is comprised of a mounting base for securing the trolling motor to the boat, an electric motor coupled to a propeller to create a thrusting force against the water, a shaft assembly which transmits torsional forces from the steering input mechanism (either mechanical or electrical) to the coupled electric motor and propeller located on a bottom portion of the shaft, effectively directing the thrusting force against the water. The typical trolling motor is connected to a power source which consists of a single battery in a 12V DC system or two or three batteries connected in series in a 24V or 36V DC system, respectively. Some bow mount trolling motors are manually or mechanically steered with a tiller handle or a type of mechanical foot pedal and pulley system. Other bow mount trolling motors are electronically steered with one or more electric actuators driving a steering mechanism attached to the shaft assembly. Characteristic of electronically steered motors, an electric actuator is typically housed inside the mounting base and rotates the shaft for steering. This method of steering control significantly increases the functionality of an electric trolling motor for navigation and boat control by eliminating the need for physical control via tiller handle or mechanical foot pedal. Electronic steering control enables the implementation of more advanced control systems for electric trolling motors than manually or mechanically steered motors offer because of the ability to control the electric actuator with programmable devices. Electronically steered motors have the ability to be entirely electronically controlled. They can be controlled by hand held remotes, wired and wireless foot pedals and recently by a chartplotter/fishfinder device. The electronic control system controls output power by varying the speed (RPM's) of the thruster motor and also controls the heading of the boat by commanding the steering motor. Currently there are several variations of electronic control systems for electric trolling motors, including manual input, compass-guided, and Global Navigation Satellite System (GNSS) controlled.

Manual input control systems allow the trolling motor's speed and heading to be varied to control the speed and heading of the boat. These systems are available with either an electrically wired or wireless foot pedal as well as handheld remote controls. This manual system requires constant attention of the operator to keep the boat's track on the desired course. Users that are concurrently commanding the trolling motor and attempting to fish find their attention divided between fishing and adjusting the speed and direction of the boat. With so many tasks to attend to at once, the user is often unable perform well at either driving the boat or fishing or both, leading to a degraded fishing and boating experience.

Compass-guided autopilot control systems are the next level of advancement in control beyond manual input control systems and utilize an electronic compass mounted on the motor head to allow the motor to maintain heading of the boat with or without manual adjustment and input from the operator. While these systems effectively maintain a magnetic compass heading, prevailing forces such as wind, waves and currents can push the boat off course over time. This leads to deviation from the original target point or location over time while the heading is still being maintained—this deviation is often referred to as "drift" from the intended course. Compass-based autopilot control systems are susceptible to numerous sources of error, such as compass level error, magnetic interference, and compounded deviation from an originally targeted point as a result of drift and any other sources of error. Compass-guided autopilot systems are available with handheld remotes, foot pedals, and sometimes controls on the motor head.

GNSS (Global Navigational Satellite Systems) control is currently the most effective and capable autopilot technology that has been integrated with electric trolling motors and utilizes a GNSS antenna and receiver along with an electronic compass mounted on the motor head to provide positional boat control. With the advancement to a GNSS controlled system, much greater versatility and control of the boat is gained. Functions such as anchoring in a specific GNSS location, following a route consisting of multiple GNSS points, and following a GNSS heading vector allow the boat to be navigated and controlled without being pushed off course by wind, waves, or current. Speed (over ground) can also be precisely controlled along the desired route of the boat with the GNSS control system. With both speed and heading precisely controlled, this gives the fisherman or operator the ability to troll or navigate along specific routes at precise speeds, which are both considered important aspects in maintaining boat control and increasing the ability to catch fish. By not having to manually control the heading and speed at all times, this makes the operator or fisherman "hands or feet free" of the boat control. The user can then perform other tasks such as attending to fishing equipment or catching fish as the boat moves along. An 'anchor' feature that was not possible with non-GNSS trolling motors is now achievable and a very useful feature on GNSS systems. By allowing the boat to be "anchored" at a specific set of GNSS coordinates by the electric trolling motor, the need for anchor and rope/chain is eliminated, which is time consuming to deploy and retrieve, can spook fish as it is being dropped, and allows significant drift and swing of the boat in deep water and windy conditions. The GNSS anchor also allows "anchoring" in fragile marine environments such as coral reefs without causing harm or damage to the reef environment unlike a traditional anchor, as it drags and claws along the bottom. All of the GNSS features including following a route, following a vector, speed control and anchoring free up one person in the boat to perform fishing related or other tasks as where typically they would have been responsible for controlling the boat position.

GNSS controlled bow mount trolling motors are the latest technological advancement in the field. These can be differentiated from prior technology based on semi-autonomous capabilities and advanced functionality made possible by position detection and automatic control based on gathered position information. Methods and systems for accomplishing boat speed, direction and position control via GNSS and other position detection devices have been disclosed in numerous US patent publications. U.S. Pat. No. 5,386,368 A describes a method of holding a boat in a fixed position using an electric trolling motor and a position detection unit. U.S. Pat. No. 5,491,636 discloses a system and method for "anchoring" a boat without the use of rope, chain, anchor, or other weight with the use of an electric trolling motor and GPS. U.S. Pat. No. 5,884,213 takes the GNSS capabilities a step further by enabling the electric trolling motor to follow a plurality of points selected off a map, follow a plurality of manually input points, and store and retrace a "recorded" series of points forming a route. Additional functions have been described such as the ability to propel a boat along a vector route, and maintaining a constant course over ground. U.S. Pat. No. 6,678,589 combines many of the aforementioned functions along with a GPS receiver at a second location on the vessel in order to provide more accurate boat positioning.

There are a variety of products on the market that make use of GNSS control as described previously including Minn Kota i-Pilot, Rhodan HD GPS Anchor, and Motorguide Pinpoint GPS. These commercially-available systems all feature an electronic controller mounted on the electric trolling motor head which includes a GNSS receiver and antenna along with an electronic compass for GNSS navigation. They all include a handheld, wireless remote for sending signals to the electronic controller. They include an "anchor feature" and a "cruise control" feature, in which a specific speed can be set, and will follow a pre-recorded route or vector heading.

These GNSS controlled systems have several shortcomings. Each of the systems above have a limited storage capability, with 6-8 routes and 4-8 waypoints or 'spots' being the standard benchmark amongst like products. As noted, routes and waypoints have to be pre-recorded using these devices by manually navigating the route or having been physically at the 'spot' to capture the position data required to repeat the location. Perhaps the biggest shortcoming of these units is that none have any mapping screen or device included in their remotes—although a user can be brought back to a specific location or over a previous route, the user does not have visual feedback of where the route or waypoint is located. There is also no way for the user to obtain the position or heading of the boat without this type of visual feedback. With no mapping device or other method to input locations, pre-planning of a route or desired waypoint is not possible. These units also do not have any accessible storage capability such as a memory card to access or store additional data beyond the limitations of the remote's integral memory. If the 6-8 routes and 4-8 waypoint storage capacity is being fully utilized, a route or waypoint would have to be deleted before another is able to be added. These systems also lack the ability to transfer routes or waypoints, and are thus without the ability to transfer them from the remote to another device. This is a highly desired ability by many boaters and fishermen in order to be able to use the data for other uses besides controlling the device on which the saved information resides, such as pre-trip and planning and post-trip analysis.

U.S. Pat. No. 8,761,976 was assigned to Minn Kota. This system links by hardwire ethernet connection a GNSS-equipped chartplotter/fishfinder device to a trolling motor for advanced control of the trolling motor using the mapping capabilities available on the chartplotter. This system simultaneously uses a wireless remote to provide feature control similar to the i-Pilot. Most marine chartplotters/fishfinders have the ability to store waypoints and are typically equipped with a memory card for storage and removal of navigation data. By adding the chartplotter to the trolling motor control system, the system is capable of increased storage and memory capabilities for routes and waypoints as well as GNSS mapping capability. With GNSS mapping capability on the chartplotter as well as lake and depth charts, the i-Pilot Link system has the capability to perform advanced features such as following a depth contour as described in U.S. Pat. No. 8,645,012. The system is not capable of an instant network connection for sharing waypoints or routes. The system also lacks the ability to share other information pertinent to the route or waypoint such as pictures or notes. The system is a complex, multi-piece solution limited to other Johnson Outdoor brand (Minn Kota, Humminbird, and Lakemaster) products. For example, along with the Minn Kota trolling motor, the i-Pilot Link system requires the Link remote, a Humminbird fishfinder/chartplotter to utilize the mapping features and increased storage, and Lakemaster digital maps to allow the follow a depth contour function. Purchase of each required component is cost-prohibitive for the average boat owner.

At present some progress has been made towards integrating networked mobile devices with certain electronic systems found on many fishing and pleasure boats such as chartplotters and fishfinders. U.S. Pat. No. 8,433,463 discloses an application in which a handheld device such as a smartphone or tablet can be used as a secondary controller or peripheral display device for a chartplotter of fishfinder system. However, the mobile device is not capable of making any change to the speed, heading or position of the boat.

The advancements in electric trolling motor capabilities have outpaced the advancements in control system technologies. What is needed is a single handheld, networked device to be used to control the speed or heading of any propulsion system on a vessel such as a boat to affect the position, speed, and heading of the vessel. Prior inventions have failed to offer a single handheld device that provides visual input and feedback capabilities that enable a complex suite of navigational capabilities in a single input device. Prior discoveries have also failed to address shortcomings in navigational data storage, access, and sharing.

It would be most desirable for a fisherman or other boat users to create a route or preselect a waypoint from a map on a familiar device, such as a smart-phone where mapping and mapping display ability is already included as a commercially available function or feature. It would also be most desirable for a fisherman to have increased or relatively "unlimited" storage capability for routes, waypoints, maps, pictures, weather conditions, water conditions or any information regarding or related to their route, waypoints or time on the water. It would be most desirable for fishermen to quickly and easily share this information with other users of the same systems through online networks and social networking. It would be most desirable for a user to utilize their existing smartphone or networked mobile device as both their remote control and input device for routes and waypoints for control of their trolling motor. The invention described below will accomplish these items.

BRIEF SUMMARY OF THE INVENTION

This invention provides an electronic control system for a steerable thruster such as a bow mounted trolling motor that is comprised of a mobile networked capable peripheral input device running a system specific mobile application, an electronic control unit and one or more sensors for detecting global position and orientation of the thruster. These components can be separate units or all one unit as will be further described.

In the preferred embodiment of the architecture, an electronic control unit is added to the control system to receive remote input signals from the mobile device and to provide input signals to the existing motor controller to control the heading and speed of the steerable thruster. In this form, two controllers make up the control system. The existing motor controller controls the steering and thrust functions of the motor and a second controller is added to receive input from the peripheral mobile networked input device and includes sensors to provide GNSS position and compass orientation of the thruster. The second controller, hereon referred to as the electronic controller, inputs control signals to the motor controller, based on control mode and sensor data, to provide specific thrust and steering commands to manipulate the thrust and steering to obtain a specific vessel position. Because many motors are sold with only a motor controller for controlling the thrust and steering of the motor, the preferred embodiment utilizes this existing architecture as part of the overall control system rather than replacing the motor controller with a single controller to control all functions.

In another form a single electronic controller contains all the necessary architecture and sensors to provide control of the thrust and steering as well as provide the position and orientation control required for a GNSS controlled system. This form would be applicable to a motor that was being produced with the GNSS control system as a standard feature and thus eliminate the need for a secondary controller.

The controllers in the two previously described forms would be used with a peripheral input device in the preferred embodiment. In an alternate embodiment, network capability would be added directly to either the single or multiple controller system via a mobile network chip and an input device such as a touchscreen and one or more push button switches could be utilized on the controller to eliminate the need for a peripheral input device.

In an alternative embodiment of the architectural configuration the electronic controller contains the direction sensing device, algorithms and control. The peripheral input device contains the GNSS positioning, the user input interface, and the software application. In this configuration, the peripheral input device is enabled with the GNSS service and provides the positional information to the control process.

In an alternative configuration, the electronic controller provides the control. The Peripheral Input Device provides the GNSS service, the direction service, the software application for control and the user input interface. For this configuration, the Peripheral input device is mounted on the steerable thruster, and would provide both the positional and directional information from its internal sensors.

In another embodiment a mobile device such as a smartphone equipped with GNSS and magnetic compass sensors is utilized as both the peripheral input device and the electronic controller. This eliminates the need for an additional peripheral input device, though additional devices could still be connected to the network to provide multiple input options. Multiple peripheral input devices could also be used with any of the other aforementioned configurations.

The electronic controller consists of a control system utilizing positional and direction signals, control signals from the peripheral input device. The controller is configured to interface to the steerable thruster system to control the output power and the directional heading of the steerable thruster. In some embodiments the electric control system has the ability to provide two way connectivity to online networks. This network access provides system upload and download of data and information relative to the function of the steerable thruster and steerable thruster control system.

The electronic controller described herein contains a GNSS positioning device. Common names for GNSS are: GPS (US), GLONASS (Russian), Galileo (European), and BeiDou/COMPASS (Chinese). GNSS (Global Navigation Satellite System) is a satellite system that is used to pinpoint the geographic location of a user's receiver anywhere in the world. In some embodiments, basic positioning is performed as time-based GNSS with no correction. In other embodiments positioning is enhanced using a differential correction such as WAAS technology. In some embodiments positioning may be enhanced for faster time to first fix using an assisted method to receive the positional fix data (for GPS system, commonly called Assisted-GPS or A-GPS). The positional fix data is transmitted through connection to a global data network.

In addition to the position device, a device for determination of the heading and orientation of the steerable thruster is required for the control system. The most basic configuration consists of a compass to determine the direction of the steerable thruster. Types of compass may include the following examples: 2 or 3 axis electronic magnetic flux/hall sensor or a mechanical compass with sensing such as but not limited to the following examples: position encoding, potentiometer and/or hall effect sensing. A further configuration to determine heading of the steerable thruster may utilize differential GNSS, by utilizing 2 antennas fixed relative to the axis of the thruster.

Several configurations for the physical location of the positioning device include: integral to the peripheral device, integral to the electronic controller, or integral to the base vessel or motor or on mounted accessories. Multiple GNSS devices may be used to provide for added accuracy and redundancy using a variety of methods. Examples of these methods include; a differential created between multiple GNSS receivers on the vessel. A differential is created by using the multiple sensors as having fixed relationship spatially to one-another. Multiple GNSS devices are used in this way for orientation information when located at fixed locations. Additionally, when multiple GNSS devices are implemented, they can be used for redundancy or backup such as when one is either inaccurate or has failed, where the system detects the failure through use of GNSS accuracy data (commonly referred to as Position Dilution of Precision (PDOP)) or from unrealistic observed results, such as impossible position changes as determined by last know position, speed, heading or other available observations.

The electronic controller in one form is housed inside an enclosure and mounted to the shaft of the bow mount trolling motor below the motor head. In other embodiments the electronic controller may be unhoused and either a potted or non-potted circuit board or controller assembly. An enclosure is not necessary or critical to the function of the control system but offers the base structure for assembling the electronic controller and protection to fragile electrical components. The enclosure also facilitates a sealable or waterproof design which is desirable in the intended marine environments where the system will be utilized.

In alternative embodiments the controller could be mounted anywhere on the outer surface of the shaft, motor, and motor head or onto any attachments to these components or anywhere on the rotating thrust motor assembly. The controller may be attached using other tool less methods wherein the fixator is in the form of cam action clamp(s), snap lock clamp(s), snap hook(s), adhesive or tape, hook and loop pad(s) or strap(s), magnetic clamp(s), rope, cables, cable ties, socks, or other tool less methods. The fixator may be in a form utilizing a device which requires tools to secure such as a device held together by fasteners such as screws, bolts, rivets, and band clamps. The fixator may also be in a form utilizing a permanent attachment method such as welding and brazing. However, a tool less method is more convenient from an installation and removal standpoint, which enables greater modularity of the device and easy transferability from one thruster to another.

In alternative embodiments the controller is mounted inside the motor head, shaft or motor housing using existing mount holes, added mount holes, adhesive, Velcro, foam or other positioning materials, or placed inside any of these allowing it to be held or contained. Locating the controller in any of these locations may eliminate the need for an additional enclosure.

In other alternative embodiments the controller is mounted independent or remote of the rotating motor assembly such as on the motor base or the boat. Sensors or a mechanical device could determine the motor thrust heading. The sensors or mechanical device may be in the form of optical or positional sensors, linear or rotary sensors or any other kind of electrical, mechanical or other sensor or system to determine the thruster direction or heading.

Alternatively, the heading relationship between the controller and the thruster is manually input by the operator if not directly aligned with the thrust of the motor.

In one form a mobile or wireless networked touchscreen device such as a Smartphone or tablet (computing device) is used as the remote control or network capable peripheral input device for a bow mounted trolling motor control system.

In another embodiment the smartphone and tablet may be used in conjunction with each other with the tablet providing large screen viewing of maps and the smartphone providing mobility or portability around the boat.

In another embodiment the electronic controller is controlled by multiple phones or tablets simultaneously. Multiple control stations may be established about the boat based on common boat locations used by the operator. For example, control stations at the bow and stern of the boat are potential locations to mount control devices based on the fisherman or operator spending considerable time in these locations during use. A plurality of peripheral input devices such as smartphones could also be used by multiple operators on the boat to provide more versatility for control of the vessel. In the event that one operator or occupant is preoccupied with a task and cannot operate the controls, another may utilize their own mobile device with application installed to control the vessel.

The control device embodiments described above may be used together in any combination thereof.

A steerable thruster may be embodied in several ways. One is an electric trolling motor, which could be bow mounted, stern (transom) mounted, side mounted, or mounted somewhere within the confines of the boat. (Center mounted for example.) Alternatively, the system may be applied to a stern/transom mounted fossil fuel engine. In the case of modern engines, there are computers and other electronics connected to the engine that would allow for manipulation of throttle to control speed. In the case of non-computer-controlled engines, an electromechanical actuator is required to manipulate a throttle. In the case of most transom mount engines, an additional electromechanical actuator is required to physically steer the engine. These actuators would be controlled by the electronic controller in the same manner that the actuators are controlled on a bow mount electric thruster as described previously and follow the same logic thereafter.

To describe further the mobile network capable peripheral input device, minimum requirements are a human control interface such as a touchscreen, button set, slider, and/or joystick; a form of software application or access to another device on which software functions are performed, and a wired or wireless interface with the electronic controller. Additionally, feedback information to the user at the input device would be desired to be included, although not necessary, and could include feedback of current state of the thruster including mode, speed and direction and position on a map, showing a targeted route and/or boat position and orientation. Also, feedback to the user could include haptic type, such as vibration, or visual such as warning and information messages.

Typical brands of smartphones include the Apple Iphone, phones running the Android platform such as the Samsung Galaxy S-series or Motorola's Droid series, Blackberry phones, and Windows phones. Typical brands of tablet computing devices include Apple IPad, Android tablets, and Windows tablets. These smartphones and tablet devices can connect to mobile ground-based cellular networks such as 4G, LTE, 3G, GSM, and others as well as future mobile networks. Local type connections may also be utilized for connectivity such as Wi-Fi connection, including using local only or with connection to a global network through any of the other above mentioned networks. Satellite network connections are also available, including: data-only and/or satellite cellular networks such as the Iridium network.

Alternatively, mobile computing platforms may also be used such as laptops and conceivably a desktop computer device. Other alternatives include new and emerging wearable technologies with mobile computing capabilities or wearables that are compatible with devices such as smartphones or tablets with mobile computing capabilities. Examples of these devices include smart watches such as the Apple Watch which is compatible with Apple or iOS phones, the U8 Smart Watch, and Samsung Galaxy Gear Watch which are compatible with android operating system phones and can also connect directly to a wireless network. Another example of a wearable input device is smart glasses such as Google Glass which allows mobile computing thru a wearable set of glasses that includes mobile network connectivity to either a phone or wireless network. Another alternative is utilizing a gaming system such as Microsoft X-Box, Nintendo Wii, or PlayStation. Further alternatives include a dedicated marine computing device such as a chartplotter or a fish finder with mobile or wireless network connectivity.

As an additional alternative a custom remote control that is capable of being connected to a network may be utilized as an input device so long as it possesses the following attributes: a human control and input interface, network capability, a form of software application or access to another device on which software functions are performed, and a wired or wireless interface with the electronic controller. This could alternatively be embodied in the form of the electronic controller itself.

In one form, the peripheral input device (i.e. smartphone, tablet, or other input device) is wired or wirelessly connected to the electronic controller. A wired connection utilizes any available combination of input(s) and output(s) from the peripheral input device capable of sending or receiving data. A wireless connection utilizing Wi-Fi, Bluetooth, ZigBee, RF control, or functionally similar networking is used to establish two-way communication with the electronic controller. Communication signals are transmitted and received between the mobile device and electronic controller. The mobile device's wireless connection may be uniquely paired with the control box to control the steerable thruster. Continuous network connection of the mobile device is not required for this system to function, as the system is capable of utilizing cached data in addition or in place of networked data, and utilizes control and sensor signals that do not require connection to the network to operate, in order to provide speed and heading control to the motor. Data transferred between the peripheral input device and the controller is referred herein as routing data whereas signals transferred between the controller and thruster are referred herein as control signals.

The benefits of wireless connection with the controller include convenience for the operator of not having wired connection therefore providing the ability to control the boat from any position on or even off of the boat in addition to the ability to easily add multiple, synched input devices. A robust wireless connection capable of sending and receiving sufficient amounts of data ensures the reliability of the motor controller. Robustness of the wireless connection may be enhanced by: handshaking methods for data integrity, Checksum, hashing or parity checking of data received, or feedback of control information from the electronic controller.

Alternatively, a mobile device having an add on chip or dongle residing in an existing electronic port internally or externally on the mobile device utilizes radio frequency or other remote communication signals to send input signals to the electronic controller from the mobile device.

As an alternative embodiment, a mobile device having capability for storage of waypoint, routing and mapping data for control generation is utilized. This would be useful when data, such as maps, route or waypoint data, resides on an internal or removable memory device in the control system. This would apply to both mapping chips as well as downloaded mapping software that permanently resides in the internal memory of the peripheral input device. Examples include commercially available products such as Navionics, Lakemaster and Bluecharts mapping chips.

Alternatively two way connectivity is accomplished through an interface or dongle as part of the electronic control system as described in the claim above to allow access to global mobile networks such as 3G and 4G or wireless links to online global internet networks such as but not limited to WIFI or WIMAX. One such configuration is a smartphone centralized data hub. A smartphone is connected to a global network and handles all data transfer to and from the web and other networked devices on the boat. The smartphone relays and receives data to and from the electronic controller(s).

Alternatively, the peripheral input device is connected with one or more wires to the electronic controller. Available connections on today's state of the art mobile devices include but are not limited to, HDMI, USB, and audio encoding to 3.5 mm bidirectional auxiliary audio input. A wired connection provides the benefits of larger quantities and faster rates of data transfer between the input device and electronic controller. In addition, a wired connection is least susceptible to interruptions and may be used as a constant power or charging source for the input device and/or the electronic controller through the other powered device or from a common power supply. Either the input device or electronic controller could be connected via wired or wireless connection to other devices on the boat such as but not limited to a sonar, chartplotter, or GPS mapping device via the methods described above.

In one form an application (App) based control system is utilized on the mobile device to input commands to the steerable thruster control system. The mobile application can utilize single or multiple online or application based mapping or nautical charting software to allow selection of a single GNSS coordinate for anchoring or navigating toward, or multiple GNSS coordinates for creation of a route or other boat navigation functions.

In one configuration, the mobile application has the ability to retrieve and interpret data from any multitude of external sources including public and/or commercially accessible databases in order to generate a map view that displays objects such as underwater contours, depth soundings, landmarks, navigational markers, satellite imagery, and more.

As one method, data is retrieved by use of an http request of a known source. The source then reads the response to the requesting device, and the response is parsed via the mobile application for interpretation. In the case of maps for example, maps are downloaded as individual image tiles via HTTP request from the map tile servers. The tiles are named for specific locations on the map and are downloaded, cached on the mobile device, and shown as needed on the app. Tiles with depth contours and other markers could also be retrieved in this way.

In other embodiments map data is received via vector data sets such as NOAA Electronic Navigational Charts or other file databases to overlay markers, depth soundings, etc. on the maps.

An interactive map interface is displayed on the input device and/or any other device comprising the control system for the steerable thruster (such as a networked sonar, chartplotter, or GPS mapping device) to enable the selection of a point or multiple points from the map or by manual coordinates entry. Selection of points on a map can be accomplished via touch screen, cursor location, or other methods suited to the input device being used. Selected points may be used for functions that are executed by the electronic controller to control the thrust and heading of the steerable thruster. Selected points can be used to define routes, either manually or automatically. A route may be manually constructed by entering a sequence of points or automatically via inferences based on point proximity and/or order of creation. Saved/stored points can be viewed and edited on the map view at any time on any device capable of displaying and interacting with the data of the capable control system.

In one form a mobile application is utilized for selection of a single GNSS coordinate "point" for anchoring or as navigation reference or for creation of a route using multiple GNSS coordinate "points". The mobile application retrieves navigational data from a single or multiple online or application based mapping or nautical charting software including but not limited to Google maps, Satellite imaging, NOAA charts and other commercially available chart and map collections.

In one form a steerable thruster control system utilizes mobile or wireless networks to communicate with an online server for manual or automatic upload and download of information and other data including data and information relative to the control of the steerable thruster. This may also include changes or updates to the software application on the input device and firmware loaded on the electronic controller.

Various embodiments of the system utilize HTTP request to a cloud web Application Programming Interface (API) such as ProNav Cloud Web API for example. Via this protocol, a user selects an option on the input device to share data from their account with other user(s). Data is encoded and sent via one or more HTTP requests to the ProNav Cloud Web API. The ProNav Cloud Web API processes the request and saves the data to the cloud database. The ProNav Cloud Web API notifies other users that data has been shared with them. Upon another user's choice to save the data shared with them, an HTTP request(s) to download the data is sent to the ProNav Cloud Web API. The ProNav Cloud Web API sends an HTTP response with the encoded data that was sent from user 1 and it is saved to their account and automatically or manually synced across all of their devices.

An alternative method is implementing an HTTP request to 3rd party API. A user selects an option on the device to share data from their account with other user(s). Data is encoded and sent via HTTP request(s) to the 3rd party API. The 3rd party API processes the request and relays the shared data to User 2 via the electronic communication method of its choosing. Once received by the other user, data will automatically or manually be synced across all of the networked devices.

An alternative method of sharing is being accomplished such that data is shared between users over email via a universal or custom file format. The data file may be imported manually or automatically from the email into the networked device. Once imported, data will automatically or manually be synced across all of their devices. In addition, Bluetooth sharing/direct device connection may be implemented such that data is shared between users over Bluetooth or any other type of device to device direct connection via either a universal or a custom file format and the data may be imported manually or automatically from the Bluetooth message into the networked device. Once imported, data will automatically or manually be synced across all of the networked devices. Another method is via SMS/MMS such that data is shared between users over SMS or MMS via any type of data format. The data could be imported manually or automatically from the SMS/MMS. Once imported, data will automatically or manually be synced across all of the networked devices.

Data may also be shared via social network in any type of format via any data transfer protocol. The data may then be imported manually or automatically from the social network. Once imported, data will automatically or manually be synced across all of the networked devices. The automatic sync feature operates as a user-enabled feature that grants the input device permission to send and receive data on the user's behalf when there is new data to be synched across the networked devices. Any other electronic communication past or present may be configured for the application described above.

Alternatively a custom file format could be utilized. A custom file format that is recognized and is parsed by web API from any sending device and a file format that is recognized by the software applications on the input device(s) would make parsing universal across all devices. A file can be shared using one of the methods stated above to another party's phone or third party app. Another method of sharing is via universal file format. This method would be the same as a custom format but achieved using a universal file format (examples include XML, JSON, CSV, etc.)

Alternatively, the electronic controller, rather than the mobile networked peripheral input device, is configured as a centralized data hub. The electronic controller has the ability to connect to global network (internet) and handles all data transfer to and from the web and other networked devices on the boat. The electronic controller relays and receives data to and from the phone.

Alternatively, a separate router may be used as the centralized data hub. The separate router is connected to a global network and allows all devices on a boat to be networked This allows sending and receiving data from all devices on the boat including controllers and peripheral controllers.

In one form the electronic controller continuously calculates updated control parameters along a curved path for the steerable thruster.

In some embodiments a trolling function is included for directing the vessel along a curved, shaped or functioned path by selecting or inputting multiple GNSS coordinate waypoints or selecting a preset or programmed curved path. The steerable thruster control system either automatically creates a navigable path such as but not limited to a multi-point spline, radiused curve, circular curve, ellipse, square curve, or repeated patterns in between or through the chosen GNSS coordinate points. The electronic controller continuously updates control parameters along the path for the steerable thruster to navigate.

In some embodiments, a fast and efficient method may be used for inputting into the system a route to follow. The route may be chosen by finger swiping a path across a screen projecting for example, a depth contour chart, satellite image chart or other real time view. For example, this method could be used to swipe a path along a depth contour line, along a shoreline with obstacles such as docks, around an island, or up and down a river channel. When creating this finger swipe route, the swiped curve creates a string of points through either an exact fit curve or a best fit curve at choice of the operator. These points are then manipulated to change the swiped path if so desired. The swiping function is best suited to a touchscreen on the input device in order to detect a finger or stylus device on the screen. A correlation is made between the position of the finger or stylus relative to the map, chart, or other real time view shown on the device screen to create points and/or construct a route. Lacking a touch screen, another method would be required for detecting input on the screen such as optical detection, thermal detection, or inductive detection among others.

Any combination or variation of the above embodiments or features of an embodiment are within the spirit of this invention.

The electronic control system may interface with the steerable thruster through any of several methods which control access of steerable thruster input conditioning circuitry. In one embodiment, the controller may provide direct control access to motor drivers, or direct control of the motors, via serial communication (for example: UART, RS-232/422/485, Controller Area Network (CAN/NMEA2000), Ethernet, USB or similar). Additionally wireless communications could be used (examples could include RF, Bluetooth, Wi-Fi, ZigBee or similar). Control signals for the steerable thruster are determined by the electronic control system and the outputs are configured to achieve the result through on-board signal processing and signal conditioning circuitry.

The two way connectivity between the electronic controller and peripheral input device described provides the system automatic or manual upload and download of data and information; storage and retrieval of data and information; and sharing of data and information relative to the function of the steerable thruster control system or the waypoint or route the system is holding or navigating. To implement this, the electronic control system described in this embodiment communicates with the peripheral input device to provide current control information and positional and orientation feedback as sensed by the position and direction sensors. The peripheral input device saves the information gathered to either on-board memory or to a dedicated server when network connected. This allows the described data to be logged, and gives the ability to select the data for future use at any time, for many uses. For example, the data could be used to provide control over a productive path, or could be used for post-trip analysis of sections of the waterway traversed.

With the described connectivity, control parameters such as gains for turn and speed information can be adjusted based on the configuration of the vessel. This would enable the user to change the rate of turn for different inertias about the vertical axis of the vessel. (A smaller, lighter vessel will have lower inertia, thus requiring less effort to turn).

Additionally, the gain utilized by the speed controller would be configurable as the inertia to move the vessel a direction is variable based upon the mass of the vessel. For gains, proportional, integral and differential gains would be used, and would be adjustable manually, by the user entering a value or moving a control, whether in the application or otherwise, or by automatic determination based upon vessel information.

Methods to determine these gains exist, such as utilizing the inertia and size of the vessel, and effort of the thruster, to calculate a control feedback equation which would be customizable to the vessel and thruster performance parameters, as well as environmental conditions. This may include information such as: motor maximum and minimum thrust, motor maximum and minimum rate of turn, location of the thrust relative to the vessel center of gravity and/or turn center, vessel moments of inertia, vessel fluid drag, wind speed and direction and water speed and direction. This data would be used to provide adjustment to control parameters in adjustments such as: increased thrust when operating against wind or currents, adjusted control gains based on the thrust available and vessel mechanical dynamic properties. Turn parameters such as dead band window, turn hysteresis, turn rate and turn error proportional, integral and differential gains are adjusted and updated via a two way connection. Additionally, speed adjustment parameters such as speed and speed error proportional, integral and differential gains could be configured.

Additional specific control adjustment parameters may also be adjusted such as dead band window for anchor, maximum error for hold position, dead band window for straight line navigation, maximum error for straight line navigation and hand-off location for next route point.

The data and information referred to above includes but is not limited to: software and/or firmware updates for the steerable thruster control system, global positional control input data of the steerable thruster including waypoints, a series of waypoints to form a route, digital maps used to generate or select routes and waypoints and data and information related to the route. The electronic control system contains custom firmware which provides the ability to adjust the control algorithm parameters directly from the peripheral input device through methods such as: Wireless upload of firmware to the control system via Wi-Fi, Bluetooth, ZigBee or other wireless communication protocol, or wired upload of firmware to the control system via serial communication such as USB, direct UART access, RS-232, 422, 485, Controller Area Network protocol (NMEA 2000, J1939), Ethernet or other wired serial communication protocol. Changes to the firmware may result from the application control on the peripheral input device operating as the interface to update the firmware in the electronic controller. Alternatively, a dedicated program could be used to provide updates to the firmware in the electronic controller.

An additional use of the connectivity to a global network is for the electronic controller to receive positional information to achieve a faster fix for the positioning device by downloading current positioning database. This is referred to as the GPS ephermis, which provides the information necessary to provide a positional fix, and is commonly implemented through the use of Assisted GPS (A-GPS).

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 17 through FIG. 30 describe algorithms which implement the preferred embodiment electronic controller.

FIG. 18 illustrates the electronic controller algorithm software flow diagram of the initialization sequence of the preferred embodiment of the present invention.

FIG. 19 illustrates the electronic controller algorithm software flow diagram of the heartbeat signal sent from the electronic controller to the peripheral input device in the preferred embodiment of the present invention.

FIG. 20 illustrates the electronic controller algorithm software flow diagram of sensor data acquisition within the electronic controller in the preferred embodiment of the present invention.

FIG. 21 illustrates the electronic controller algorithm software flow diagram of the foot pedal reversion or alternative input polling sequence of the preferred embodiment of the present invention.

FIG. 22 illustrates the electronic controller algorithm software flow diagram of the manual control function of the preferred embodiment of the present invention.

FIG. 23 illustrates the electronic controller algorithm software flow diagram of the "go to" function of the preferred embodiment of the present invention.

FIG. 24 illustrates the electronic controller algorithm software flow diagram of the "go from" function of the preferred embodiment of the present invention.

FIG. 25 illustrates the electronic controller algorithm software flow diagram of the route routine function of the preferred embodiment of the present invention.

FIG. 26 illustrates the mobile application software flow diagram of the application route interface on the peripheral input device function of the preferred embodiment of the present invention.

FIG. 27 illustrates the electronic controller algorithm software flow diagram of the heading lock function of the preferred embodiment of the present invention.

FIG. 28 and FIG. 28B illustrates the electronic controller algorithm software flow diagram of the turn control function of the preferred embodiment of the present invention.

FIG. 29 and FIG. 29B illustrates the electronic controller algorithm software flow diagram of the speed control function of the preferred embodiment of the present invention.

FIG. 30 illustrates the electronic controller algorithm software flow diagram of the receive command function of the preferred embodiment of the present invention.

DETAILED DESCRIPTION OF THE INVENTION

Referring to the Figures, several views related to the preferred embodiment of a networked steerable thruster control system are illustrated. The physical device, screen shots of the controlling software application, flow diagrams of the system architecture, and flow diagrams of the application software are included.

Figure 1:
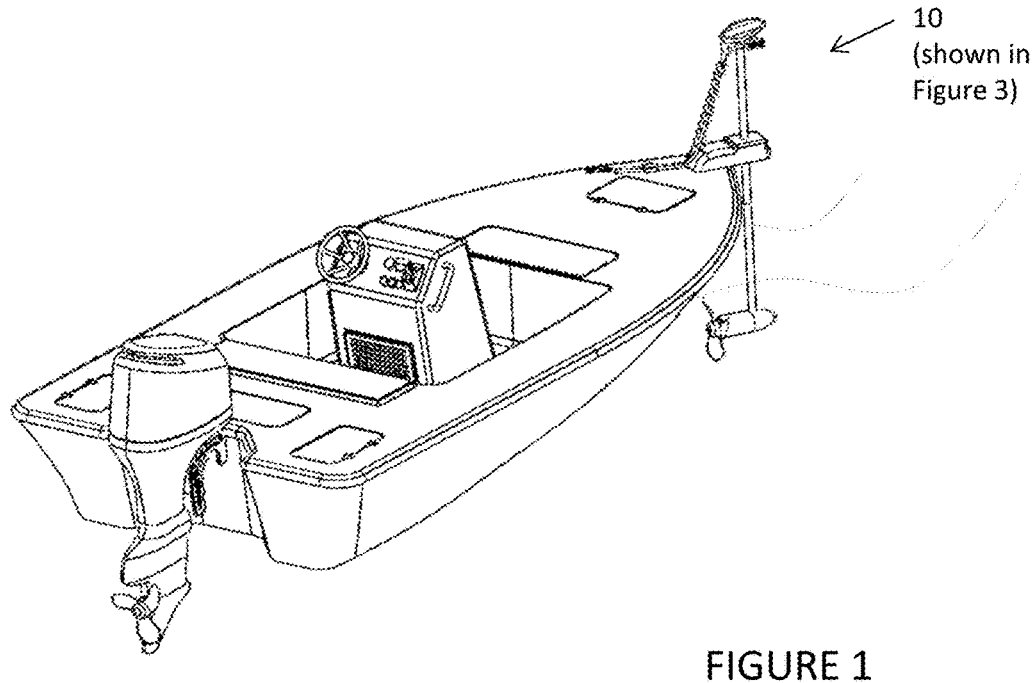
FIG. 1 is a perspective view illustrating one form of the control system utilized on a medium sized fishing boat for control of an attached bow mounted trolling motor.
Figure 2:
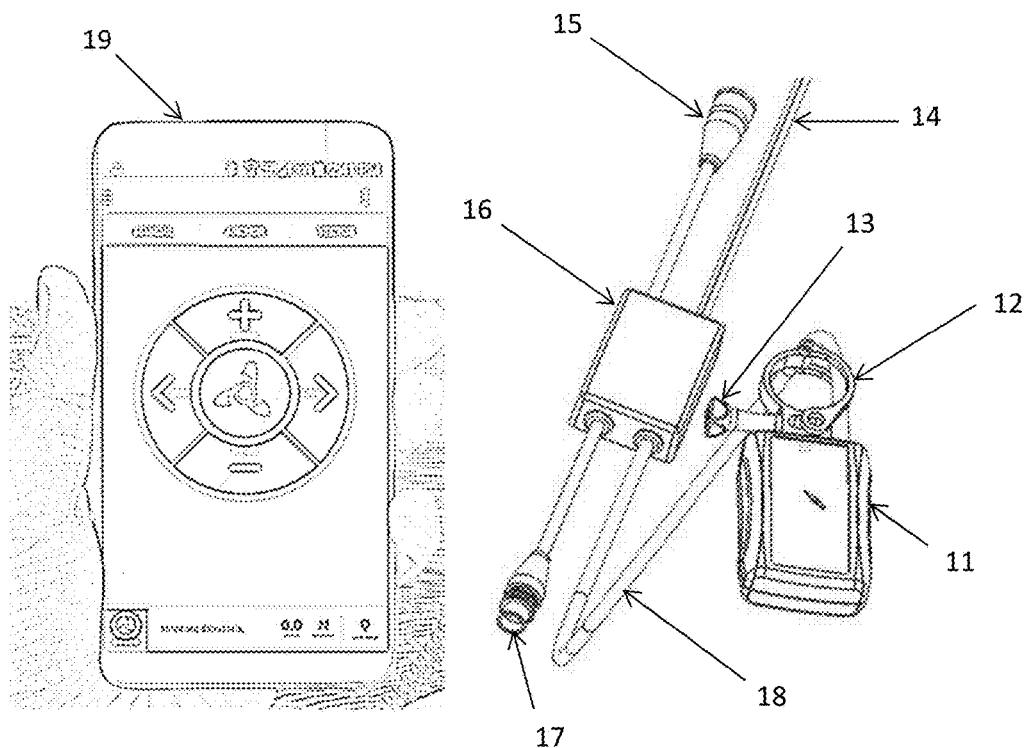
FIG. 2 are perspective views illustrating components of the control system that are utilized with the bow mount trolling motor of FIG. 1.
Figure 3:
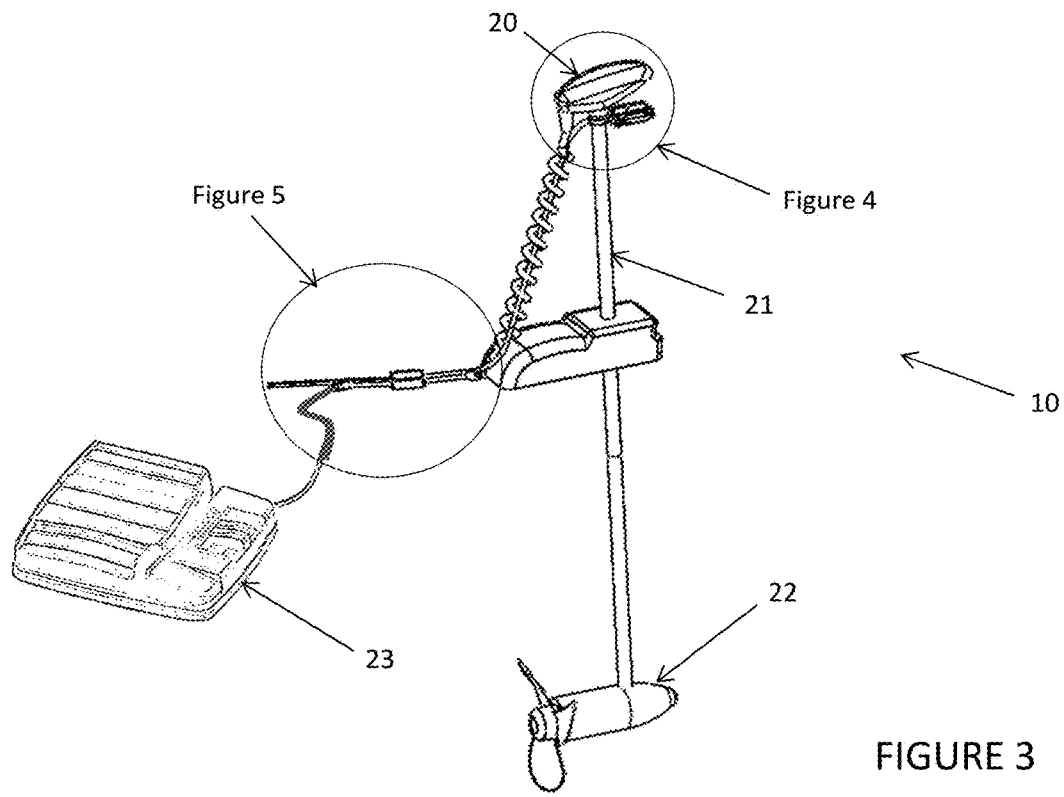
FIG. 3 is a perspective view illustrating the bow mounted trolling motor of FIG. 1 with the installed hardware.

In the preferred embodiment, a steerable thruster control system 10 is utilized to control a trolling motor 22 mounted to the bow of a boat as illustrated in FIG. 1. A mobile or wireless networked device 19 such as a Smartphone or tablet is used as the remote control for the steerable thruster control system as illustrated in FIG. 2. An application (App) based control system is utilized on the mobile app to input commands to the steerable thruster control system. A screen shot from the App is illustrated on the screen of device 19. An electronic controller 11 is utilized to receive remote input signals from the mobile device and to control the heading and speed of the steerable thruster. In this embodiment, the electronic controller stores the current route or waypoint and operational mode. A mobile application remote is used alone or in conjunction with an additional manual controller such as a foot pedal control 23. The mobile device has an integrated wireless system such as Wireless, Bluetooth or other similar system to send input signals to the electronic controller from the mobile device.

The mobile application is utilized for selection of a single GNSS coordinate "point" for anchoring or as navigation reference or for creation of a route using multiple GNSS coordinate "points". These mobile applications comprise single or multiple online or application based mapping or nautical charting software including but not limited to; Google maps, Satellite imaging, and NOAA charts. The system utilizes mobile or wireless networks to communicate with an online server device for manual or automatic upload and download of information and other data including data and information relative to the control of the steerable thruster. The information and data transferred and stored on the online server device for control of the steerable thruster is in the form of GNSS waypoint coordinates or a series of GNSS coordinates creating a route or other forms capable of establishing a waypoint or route. Additional information or data relative to the waypoints or routes such as, but not limited to, weather (i.e. temperature, pressure, wind speed and direction, cloud cover) or water (depth, temperature, current speed) conditions, boat speed, solunar information, pictures, videos, and notes is transferred to the online server device either manually or automatically. Additional meta data such as weather and water conditions and solunar data is entered manually or automatically collected by the control system from including, but not limited to, online sites, other mobile applications, accessory devices and stored with the route or waypoint.

The route, waypoint and additional information is sent as individual data or is collected and automatically saved by the system in either a universal or custom file format for transfer into a single file to the online device. It may then be sent individually or collected through a communication network in the form of email, mobile text messages, social media or other networks.

The system includes a trolling function operable along a curved path by selecting multiple waypoints. The control system automatically creates a curved path such as but not limited to a splined or sinusoidal curve in between or through the chosen points. The electronic controller continuously calculates updated control parameters along a curved path for the steerable thruster.

The generated curve and trolling path is modified by including, but not limited to, dragging or moving the original points and or modifying the parameters of the shaped route such as, but not limited to, the amplitude and frequency of the sinusoidal curve.

The electronic control system for a steerable thruster comprises of a mobile networked peripheral input device, a mobile application (App) installed on a mobile networked device, and an electronic control unit and multiple sensors. The mobile networked device, in the form of a smartphone or tablet, functions as a remote control and input device. The electronic control unit is utilized for controlling the speed and heading of a steerable thruster based on mode and target values from the input device. Sensors that are utilized in this arrangement include GPS, a form of GNSS, and magnetic compass. In this embodiment, the steerable thruster is a bow mount electrically steered trolling motor.

In this embodiment, the control system comprises an application installed on the mobile device sending input signals and commands to an electronic controller device which detects and controls the heading of the steerable thruster. The electronic control module in this embodiment is wired directly to the steerable thruster via a cable in line with an existing input device (i.e. the foot pedal or other input device already belonging to the motor) to control the speed and heading. Conventional controllers already belonging to the motor include a foot pedal 23 and handheld remote. The electronic controller may be placed either in between the conventional controller and the steerable thruster's existing control board or be used in place of the conventional controller, though not recommended. The conventional controller may still be used to provide commands to the thruster that can override the claimed electronic controller for operator safety and/or convenience.

Figure 6:
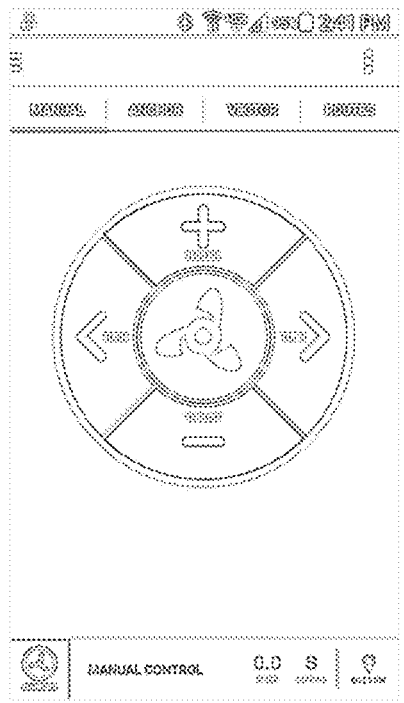
FIG. 6 is a front view illustrating a sample mobile application interface screen on the peripheral mobile networked input device for manual control mode of the electronic control system in the preferred embodiment.
Figure 7:
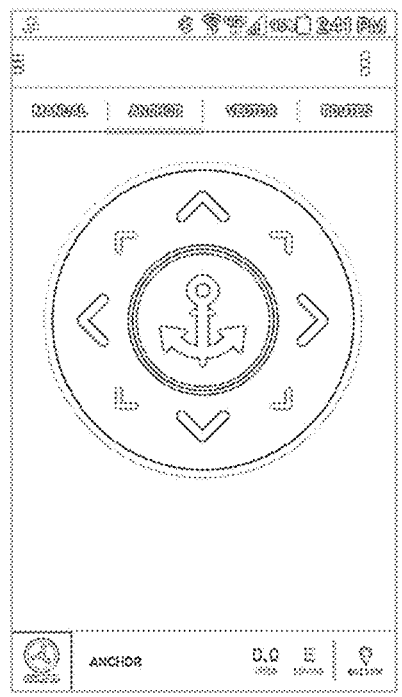
FIG. 7 is a front view illustrating the mobile application interface screen on the peripheral mobile networked input device for anchor mode of the electronic control system in the preferred embodiment.
Figure 8:
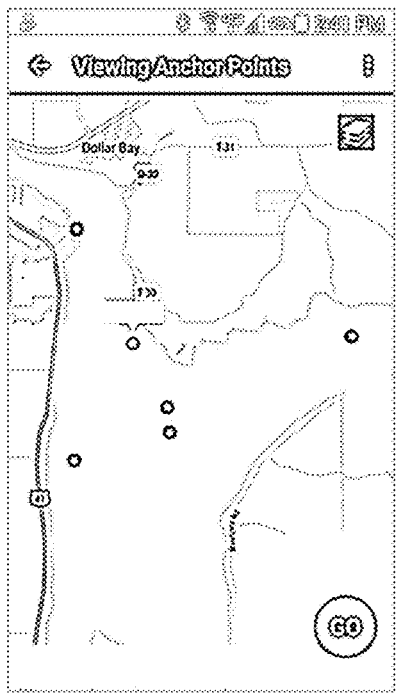
FIG. 8 is a front view illustrating the mobile application interface screen on the peripheral mobile networked input device for anchor live view control mode of the electronic control system in the preferred embodiment.
Figure 9:
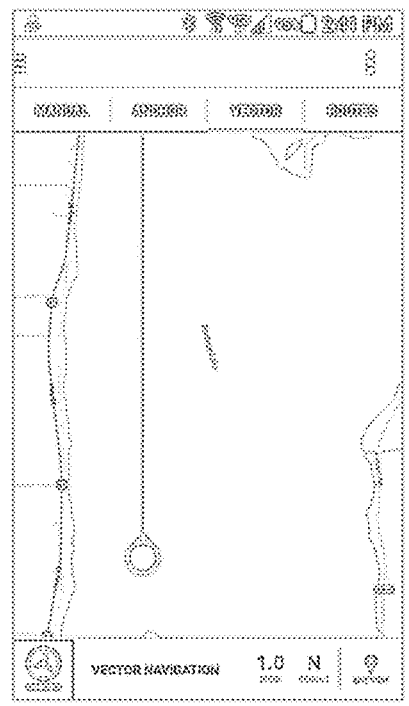
FIG. 9 is a front view illustrating the mobile application interface screen on the peripheral mobile networked input device for vector live view control mode of the electronic control system in the preferred embodiment.
Figure 10:
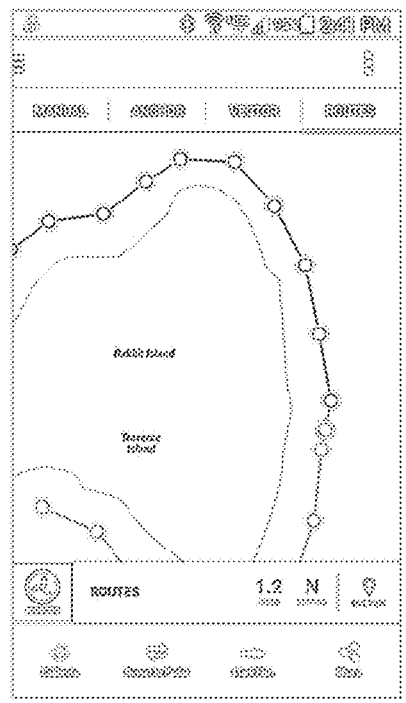
FIG. 10 is a front view illustrating the mobile application interface screen on the peripheral mobile networked input device for route live view control mode of the electronic control system in the preferred embodiment.

The heading of the vessel is determined via use of a compass mounted on the steerable thruster. The heading information is communicated to the App. Communication between the input device and electronic controller provide the control signals for the controller and additionally provide feedback from the electronic controller to the input device. The input device is used to set the mode of operation and send control commands to the electronic controller through electronic serial software commands. In this embodiment, the user may choose between manual, anchor, vector, and routes modes. A corresponding App screen is illustrated in FIG. 6 in Manual mode wherein the user can touch the screen to activate functions such as turning the motor to the left or right or to adjust the thrust. The electronic controller processes control commands and sensor data through use of algorithms to vary the outputs to change the direction or vary the speed of the thruster or both, and sense the current state of the motor. Actuation commands are sent to the thruster via serial commands or discrete electronic commands such as ground/open/high or analog level, depending on the existing architecture of the steerable thruster being controlled. FIG. 7 illustrates a sample screen in Anchor mode to instruct the trolling motor to maintain the current position or to move to a preloaded anchor point a user chooses by selection from the screen as illustrated in FIG. 8.

Figure 11:
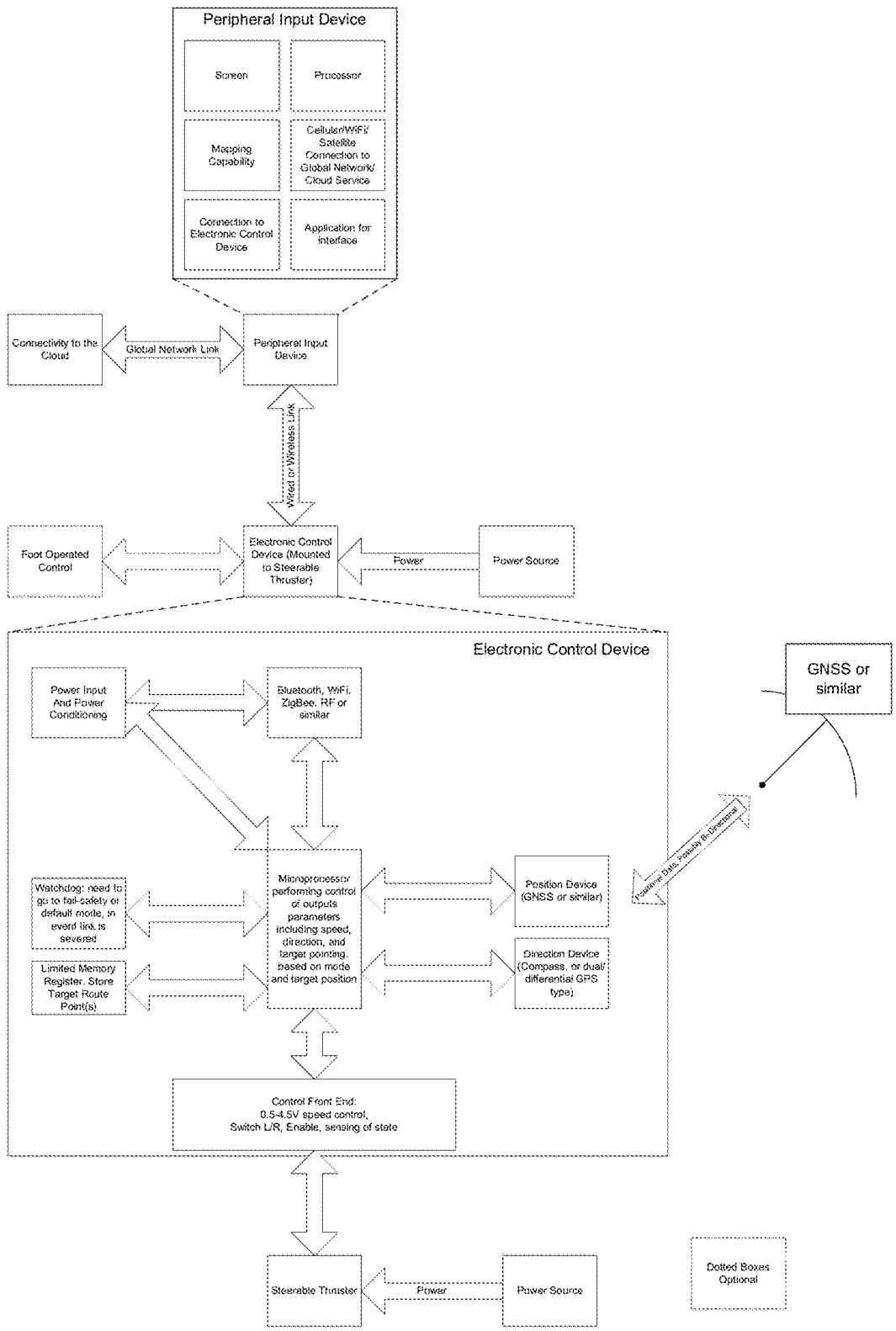
FIG. 11 illustrates a flow diagram of the architecture of the preferred embodiment of an electronic control system of the present invention.
Figure 12:
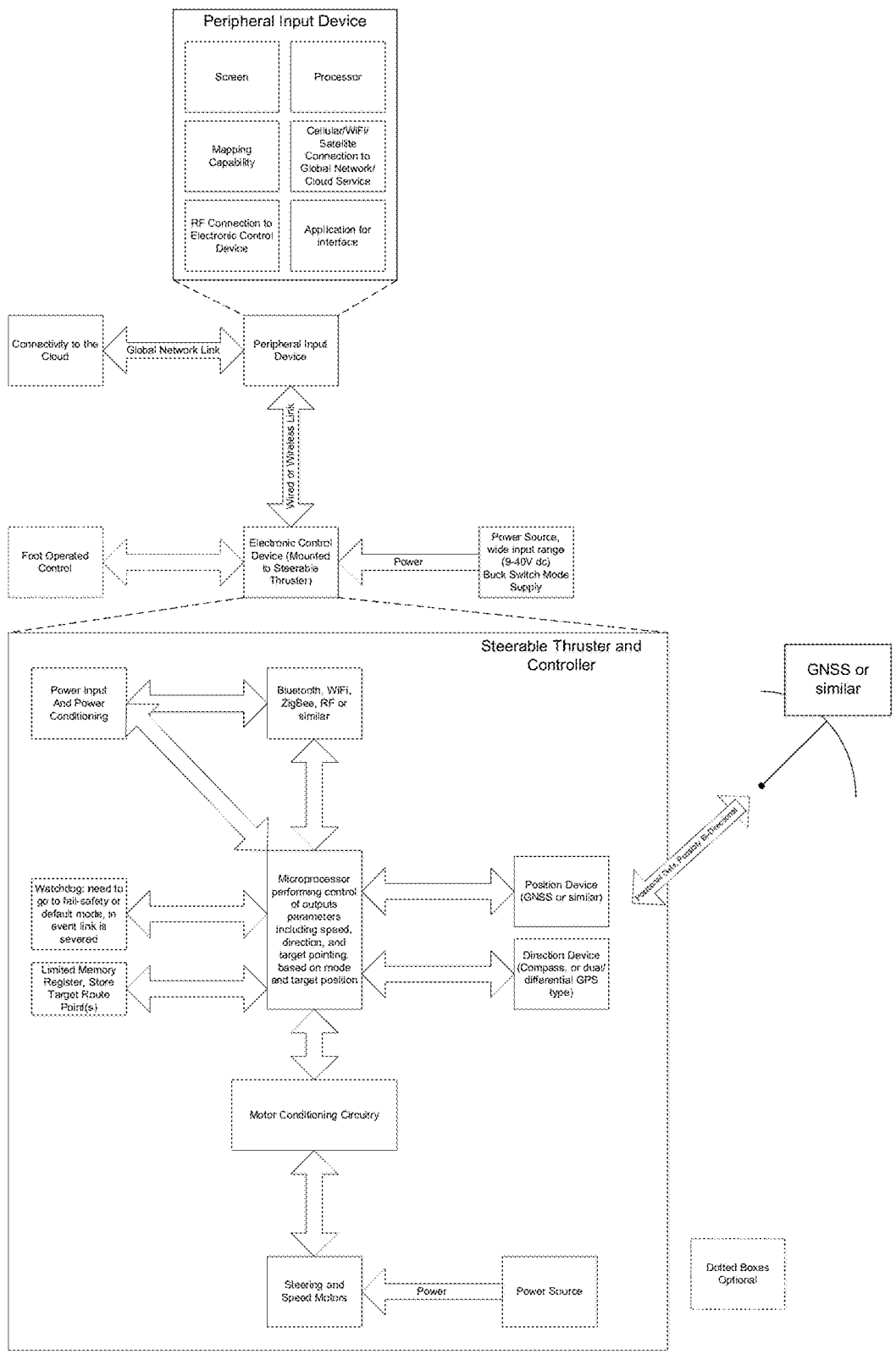
FIG. 12 illustrates a flow diagram of the architecture of an alternate embodiment of the electronic control system in which a single electronic controller is used for motor thrust, motor steering, motor positioning and motor orientation control.
Figure 13:
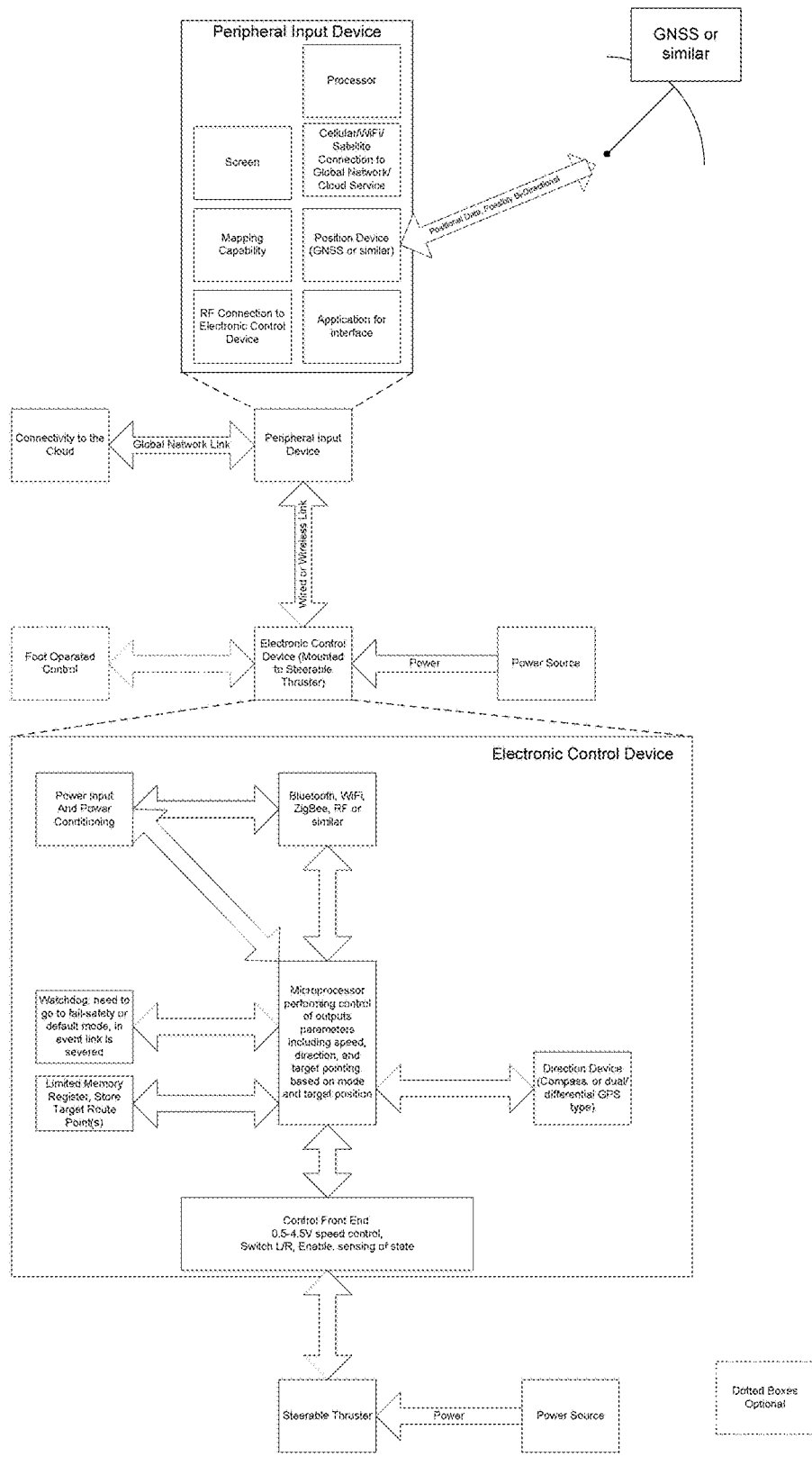
FIG. 13 illustrates a flow diagram of the architecture of an alternate embodiment of the electronic control system in which the peripheral input mobile networked device is mounted directly to the thruster and peripheral input device's GNSS sensor is used for motor positioning control.
Figure 14:
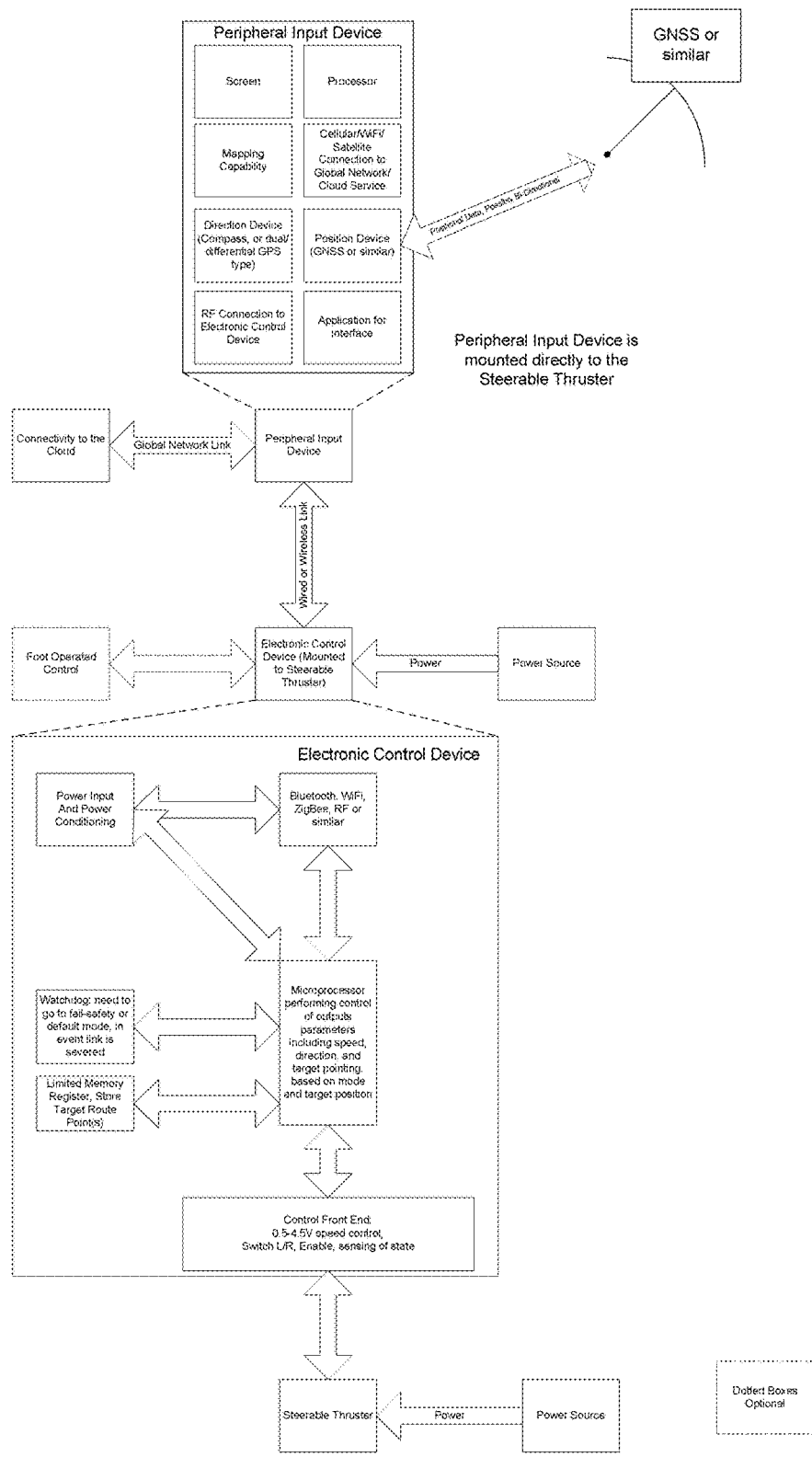
FIG. 14 illustrates a flow diagram of the architecture of an alternate embodiment of the electronic control system in which the peripheral input mobile networked device is mounted directly to the thruster and peripheral input device's GNSS sensor and magnetic compass are used for motor positioning and orientation control.
Figure 15:
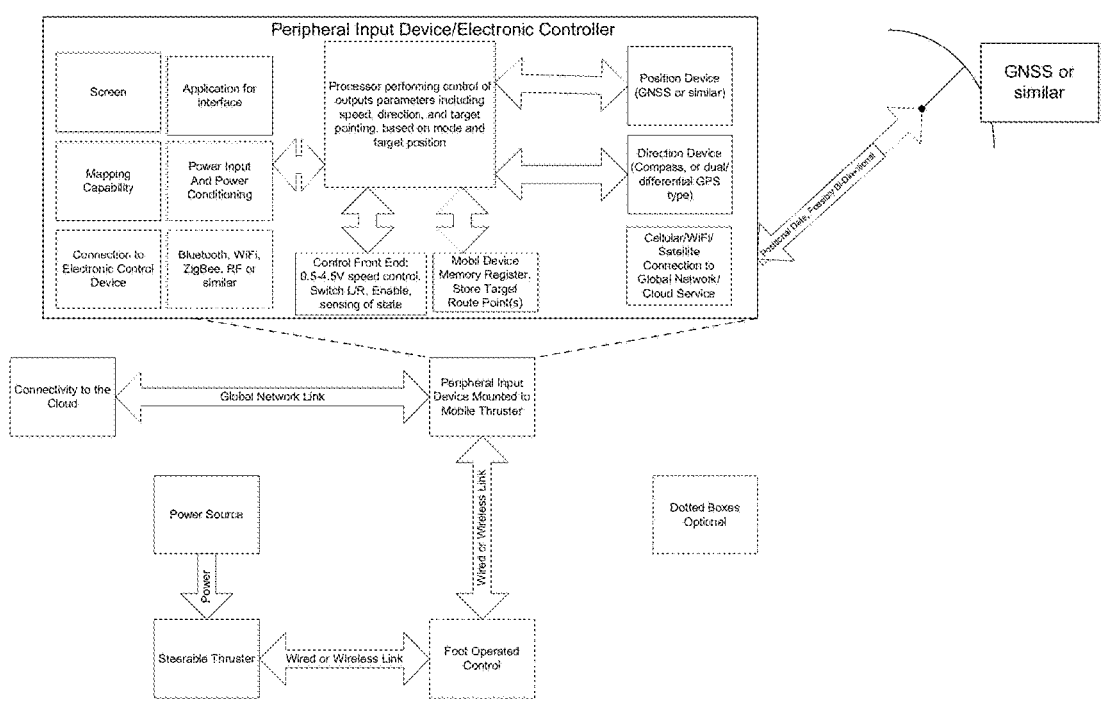
FIG. 15 illustrates a flow diagram of the architecture of an alternate embodiment of the electronic control system in which the peripheral input mobile networked device is mounted directly to the thruster and peripheral input device's control system is used as the system controller and it's GNSS sensor and magnetic compass are used for motor positioning and orientation control.
Figure 16:
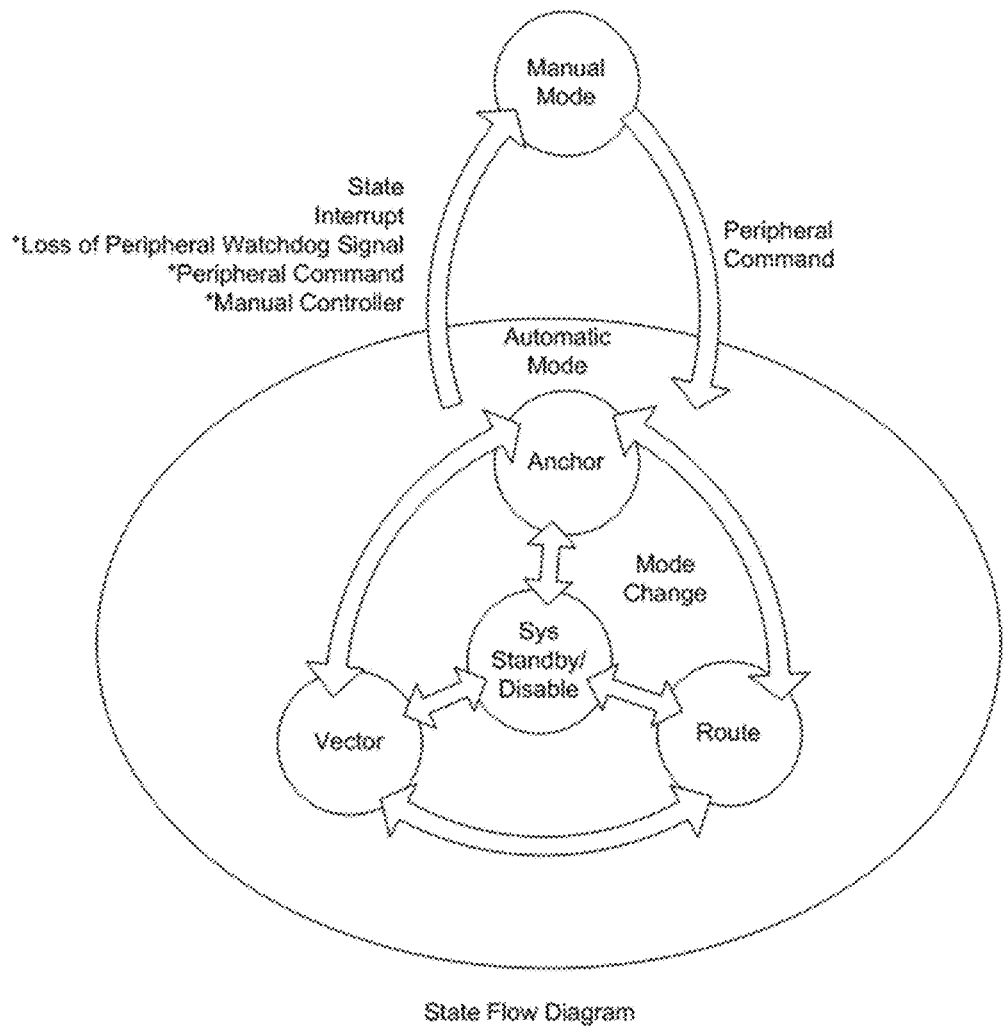
FIG. 16 illustrates the state flow diagram of the preferred embodiment of the present invention.

Configuration 1 represents a preferred embodiment and is illustrated in FIG. 11. In this configuration, the electronic controller includes a GPS position receiver device, a direction sensing device, and the necessary control for the algorithms and the outputs. The required circuitry to enable the invention in the preferred embodiment includes a power source, which is capable of providing power to the microcontroller, sensors, communications devices and the output controls. This power source is implemented as being able to condition a full range of input power typical of electric trolling motors, which include voltage levels from 12 up to 36 volts direct current. This is implemented as a step-down power supply to provide a constant 5 volts DC to run the necessary devices for operation. To accommodate the wide input range, a buck mode switching supply has been implemented. In the preferred embodiment, the electronic controller actuates the control inputs on the motor controller. To implement, electronic switches have been utilized providing a grounding control signal when a turn or enabling signal is required, and by utilizing a filtered pulse width modulated (PWM) signal to provide a speed control signal to the motor controller. This implementation is limited to one applicable interfaced product; however, by activating the control signals in any form, whether serially, wirelessly or by a control signal, many other configurations can be realized.

The peripheral Input Device includes the application and the user input. In this configuration, residing in the electronic controller are the position sensing and directional information. Not all components shown in the Figures are required for the minimum configuration but are illustrated for reference of location in the preferred embodiment.

Any data or information collected by the system or retrieved via network connection that can be physically associated with points or routes is stored with the route or waypoint and automatically saved by the system in either a universal or custom file format such as XML, JSON or CSV for transfer into a single file to the online device. In some embodiments, the system has the ability to collect and or obtain data described, either in real time or from a database source, and would perform the function of "attaching" gathered data to the physical location (i.e. coordinates, points, and routes) at which said data is relevant. Once the location information is paired with other collected data, the composite result could then be saved and stored as a new data set in either a universal or customer file format. The composite result may be stored on the mobile device or "online" on a virtual server to preserve space and memory on the mobile device. In some embodiments, the mobile device caches certain data for remote access or access any of the non-cached data real-time time via a network connection in order to display this data in various ways. The benefit of this approach is that large amounts of gathered data are conveniently associated with a physical location in the form of a unique route or point and can be used for navigation via the steerable thruster.

Networks utilized for connectivity to the server or for cloud computing includes cellular networks such as GSM, 3G, 4G, and LTE.

The collection of data and information saved with the route in a universal or custom file format may be sent as a single file through an electronic communication network, such as but not limited to, email, mobile text messages, and social media networks. Data may be saved in a relational database (examples include MySQL, PostgreSQL, MySQL) in a custom or universal file format or saved in memory. The data and information related to the route as referred to above would be shared by sending through an electronic communication network, such as but not limited to email, mobile text messages, and social media networks.

The individual data or collected information of a recognized format may be sent or shared through communication networks of the compatible mobile application of another user and could likewise be utilized by their respective control system. This sharing is via HTTP Based Request. HTTP requests are sent per API guidelines and can be saved to web DB from any device. HTTP responses are formatted in a way that can be recognized and saved to local DB no matter what device it is sent from.

Figure 4:
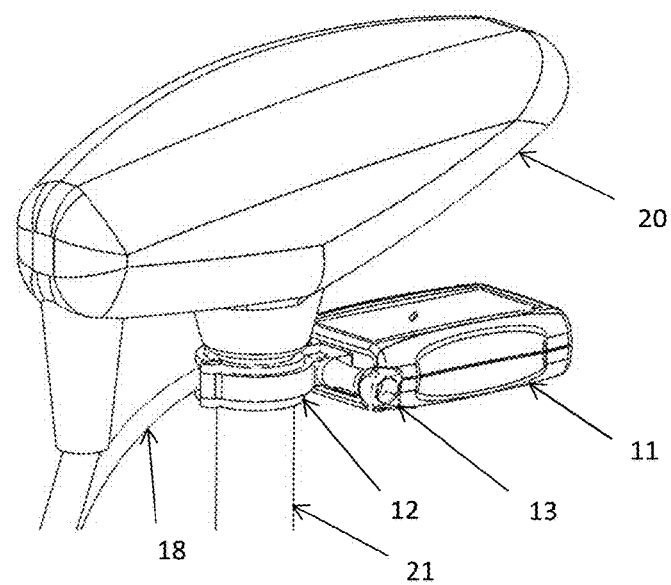
FIG. 4 is a close-up perspective view illustrating the enclosure assembly that houses the electronic controller as well as the mounting configuration of the preferred embodiment.
Figure 5:
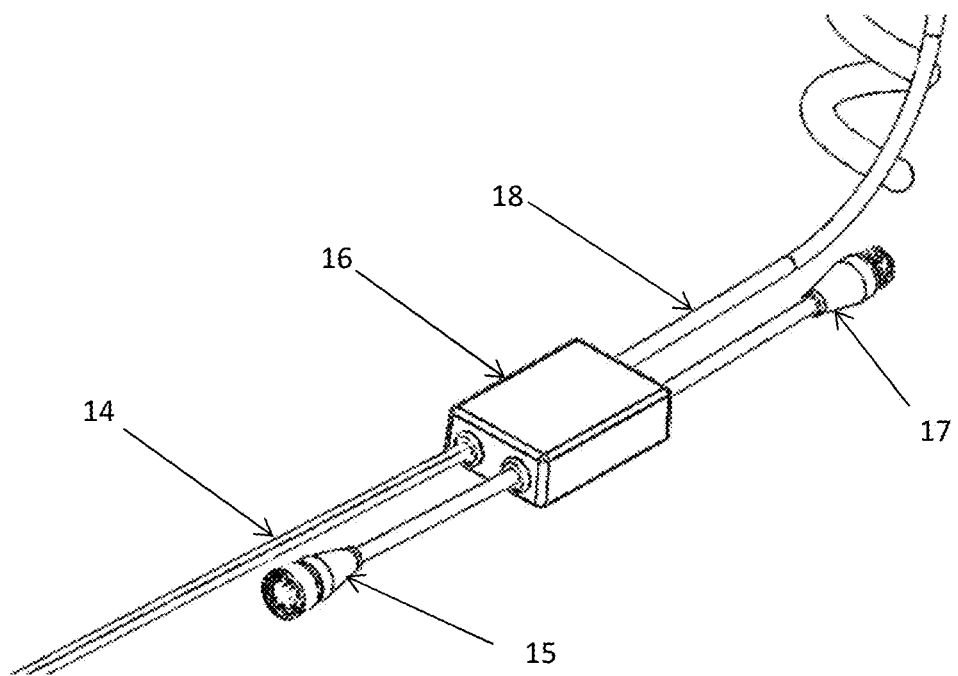
FIG. 5 is a perspective view illustrating an electrical junction box for mating the controller to the bow mounted trolling motor, and power source in the preferred embodiment.

In a preferred embodiment the electronic controller is housed inside an enclosure (FIG. 4) and mounted to the shaft 21 of the bow mount trolling motor below the motor head 20. The enclosure 11 may have a fixator, illustrated in FIG. 2 and FIG. 4, in the form of a clamping mechanism 12 to clamp the enclosure to the shaft 21 to fix alignment between the electronic controller, housed inside the enclosure 11, and the thrust motor 22. In this embodiment the clamping opens similar to a clam shell wherein each half of the clamp moves about a pivot joint. A thumb screw 13 tightens and secures the clamping mechanism about the shaft 21. Fixed alignment between the controller and thruster ensures accurate directional heading as the electronic controller automatically determines thruster heading from alignment with the electronic compass. The clamp mechanism 12 may use a tool less mounting method such as a thumb screw 13 for attachment to the shaft.

Electrical connection to the system is achieved through a connection in-line between the foot pedal 23, and the trolling motor controller, utilizing connectors 15 and 17, and a junction box 16. Power is connected to the vessel through a wire 14. Signals and power are routed to the controller 11 through a cable 18. Connectors 15 and 17 in this embodiment are commonly used connectors which are matched to interface to the existing motor. The cable is a type which is watertight and has sufficient ratings to carry the signal currents and withstand the signal and power voltages. The junction box contains signal routing between the connectors and a wide input voltage range power supply to condition the power to that which is usable by the control electronics. The input is capable of voltages typical of electric trolling motors and vehicles which here is 12 volts but typically ranges between 12 and −36 volts.

In a preferred embodiment, the electronic controller is controlled by a peripheral input device such as a mobile phone smartphone with a touch screen display. An application (App) loaded on the smartphone provides portable operation of the control system as the user moves about the boat. From this application, a variety of functions such as manual control of the motor speed thrust and direction and an overview of the location and available anchor points and routes using the map views are available as the user interfaces with the smartphone application.

In preferred embodiments a foot pedal controller 23 is used in conjunction with the smartphone or tablet to control the electronic controller. The foot pedal may be used to abort autopilot mode or to work in conjunction with autopilot mode. As a safety feature the foot pedal may be used to abort the mobile device auto pilot mode by activating any control on the foot pedal including direction or speed changes. As an alternate control the foot pedal works simultaneously with the mobile device to make adjustments to autopilot or manual modes. It may also be used to make speed or direction changes in manual mode or change an autopilot function such as vector heading or vector speed. The foot pedal may also be used by the control system to execute certain autopilot functions such as a double tap of a foot pedal to set the autopilot anchor. In another embodiment a small remote configured for mounting to a fishing rod may be used in conjunction or in replacement of the manual foot pedal to provide added versatility to the operator.

In another embodiment, a tablet or remote touchscreen computing device is utilized for control and provides the benefit of large screen display of mapping or other functions. The tablet provides portability as the user moves about the boat or may be mounted in one location as a display.

In a preferred embodiment, the peripheral input device(s) such as the smartphone, tablet or others aforementioned preferably have built in storage capabilities such as flash, ROM, RAM, EEPROM or expandable memory capability such as SD, Micro SD, or hard disk. This may be used for storage of routes, waypoints, maps or other information related to the control of the trolling motor control system. By utilizing a current mobile device the storage capability for routes and waypoints is nearly unlimited for the average user. This storage can be used for caching of maps, routes, anchor points in the event the user plans to operate in an area without global network connectivity. This data may be downloaded to the device prior to entering an area without connectivity. If the mobile device encounters memory limits for storage of all the data such as maps, routes or anchor points for all areas or locations a user wants to access, the user could select an area of interest and the system could either automatically or manually selectively load the aforementioned data from the virtual/network/cloud source for these areas.

The user may utilize an automatic update of the peripheral device's memory of data based on current location, as determined by the mobile device's GPS, to automatically update the memory with data from the cloud around a set radial distance, or geographically similar area from the current location. Storage on the mobile device may be utilized for storage of all data such as anchor points and routes and cached maps required for full functionality of the operating system. This method assumes the amount of storage on the device is sufficient and there is either no desire by the user to connect to an internet cloud or the internet cloud is not available because of the lack of a mobile or wireless network in some locations or the inability to access a mobile or wireless network. These embodiments may be used in any combination for storage of data on the peripheral input device.

To enable this invention, an electronic controller is described, having algorithms that have been developed to provide the necessary control to achieve the desired architecture and functionality. These algorithms are provided as programmable embedded firmware located within the electronic controller in an on-board Microcontroller, Field Programmable Gate Array (FPGA), Application Specific Integrated Circuit (ASIC), or other programmable memory capable of execution. The algorithms described herein are set up to provide the minimum required control, and can be expanded to enhance control where described.

The electronic controller of the embodiment illustrated here receives a command message from the peripheral input device and stores the information for use in the control algorithms. Stored in memory on the electronic controller are several pieces of information including the current operating mode that determines a specified control loop for device operation.

Some embodiments include a first mode to operate in a GNSS position hold function (anchor) to hold the current point. This function operates by acquiring the positional data at the time of selecting the hold position command, and actuating the control outputs to turn and power thrust the motor as needed thereby holding the vessel in a generally fixed location on the body of water. Alternatively, the hold function may receive a set of coordinate points for the command message to use as target coordinates. As yet another alternative, a command to move the vessel in a direction by a predetermined distance is another function of GNSS position holding. This function is useful for "anchoring" a boat in a location without the use of traditional anchoring provisions such as an anchor, rope, chain, etc.

Some embodiments also include an operational second mode utilizing a GNSS direction hold function or vector over coordinates. This function creates a vector away from the current point using starting position, current position and direction. This function does not require a point to be targeted as moving toward, but instead uses the initial starting point and directs the vector, calculating at each sample the error associated relative to a lateral permissible dead-band, where adjustment is not required along the vector desired. Directing away from the point allows for simplistic control, as additional points do not need to be created arbitrarily along the vector. To calculate the deviation from the desired vector, trigonometry is used, where a value for the maximum permissible heading angle is calculated, based on the distance from the original set-point. Additionally, virtual points can be added a predetermined distance from the thruster. This is done by choosing coordinates ahead of the current point, and navigating to each point by turning the steerable thruster to the location along the path.

Some embodiments comprise a third mode function utilizing a Magnetic Heading hold function (heading lock) which utilizes the direction device in the electronic controller to maintain the direction of thrust, and would allow for deviation from a vector as is described above in the second mode.

Various embodiments may include a fourth mode that can be navigating along a user defined/preplanned route, as the App on the mobile networked peripheral input device may have capability to display a map, and thus provide a method for which the user can create a route. With a route consisting of points to traverse, the control system utilizes any one or combination of the GNSS go-from point (vector direction hold from start), as described in the second mode, or the GNSS go-to point (control to next point), as described in the first mode, or both. An example of sharing the go-to and go-from modes is as follows: Point #n is received and is targeted as a go-to point; Point #n+1 is received, and cued for go-from. Once within a pre-defined circle radius, a go-from is calculated by creating the heading between n and n+1, and a go-from point n is performed, directed to point n+1. Once a second radius or a threshold is reached relative to point n+1, the mode changes again to go-to, and the point is targeted, and point n+2 is cued. The process then repeats.

The electronic controller also embodies a feature to provide manual control of speed up, speed down, turn left, turn right, and motor permitting to operate, by commands received from the peripheral input device. With manual control it may be desirable to also use a manual control device separate from the peripheral input device. The manual control devices may be a foot petal or handheld remote for example. The devices may be wired or wireless or a combination of the two.

For all modes, the electronic controller may store at minimum 1 point for control, and store up to the entire route or multiple routes of points information. The controller handles the messages using a few different methods in order to send successive commands. In one configuration: The message is transmitted to the electronic controller from the peripheral input device and is configured such that once the message has been verified as received the peripheral input device no longer is required to continue sending the data. The electronic controller maintains the last command. This can be used to set a command. It also allows for the peripheral input device to be powered down or the connection link severed or both while the electronic controller maintains its control function. In a second configuration: The message is continually transmitted to the electronic controller from the peripheral input device and the electronic controller determines whether to store the new information. The electronic controller may also determine to go to a safe mode in the event of control severance identified by loss of receiving data.

Figure 17:
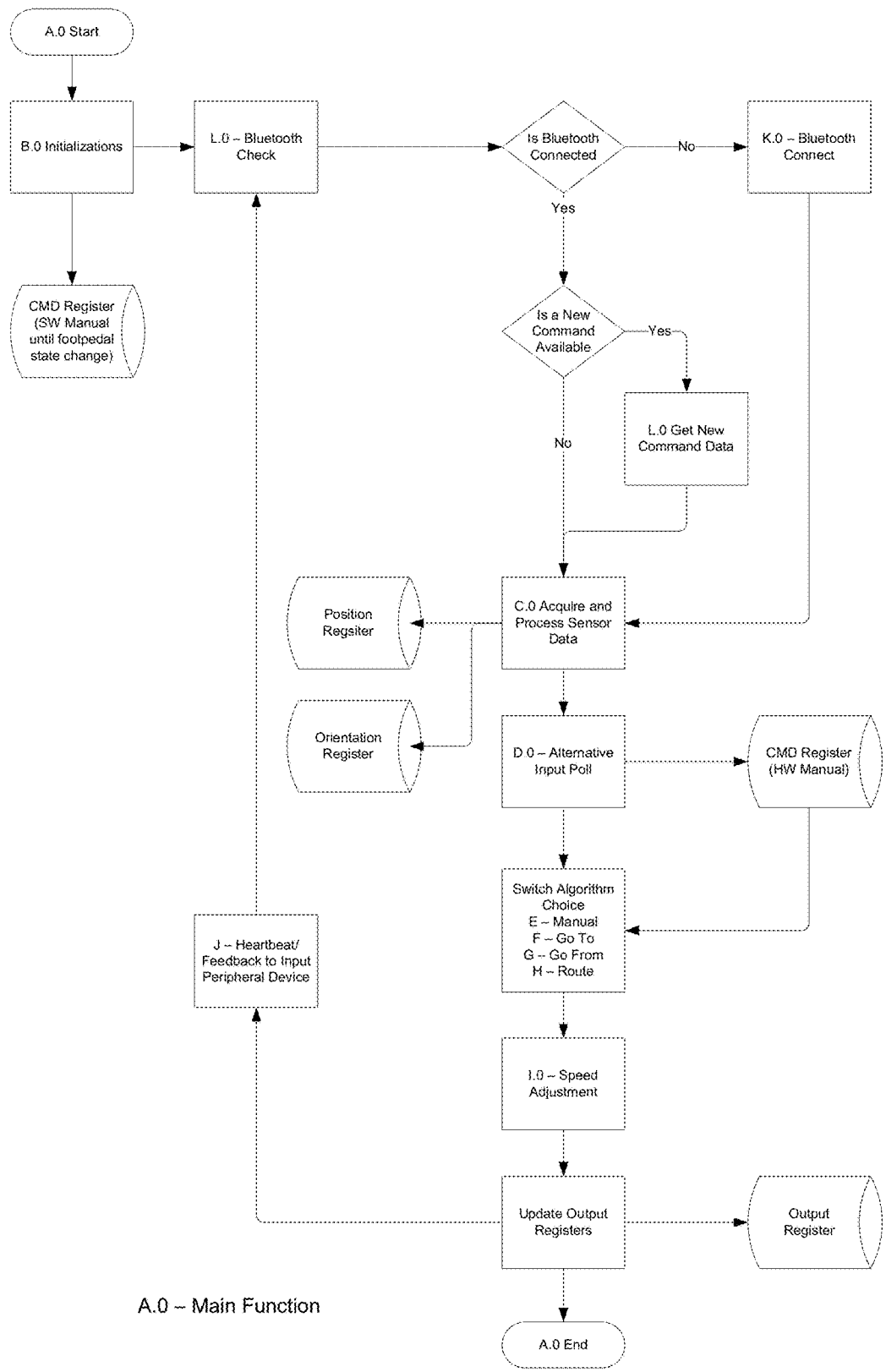
FIG. 17 illustrates the electronic controller algorithm software flow diagram of the main functions of the control system of the preferred embodiment of the present invention.
Figure 18:
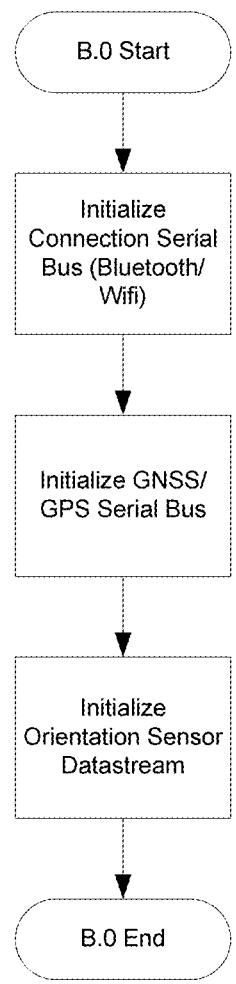
Figure 19:
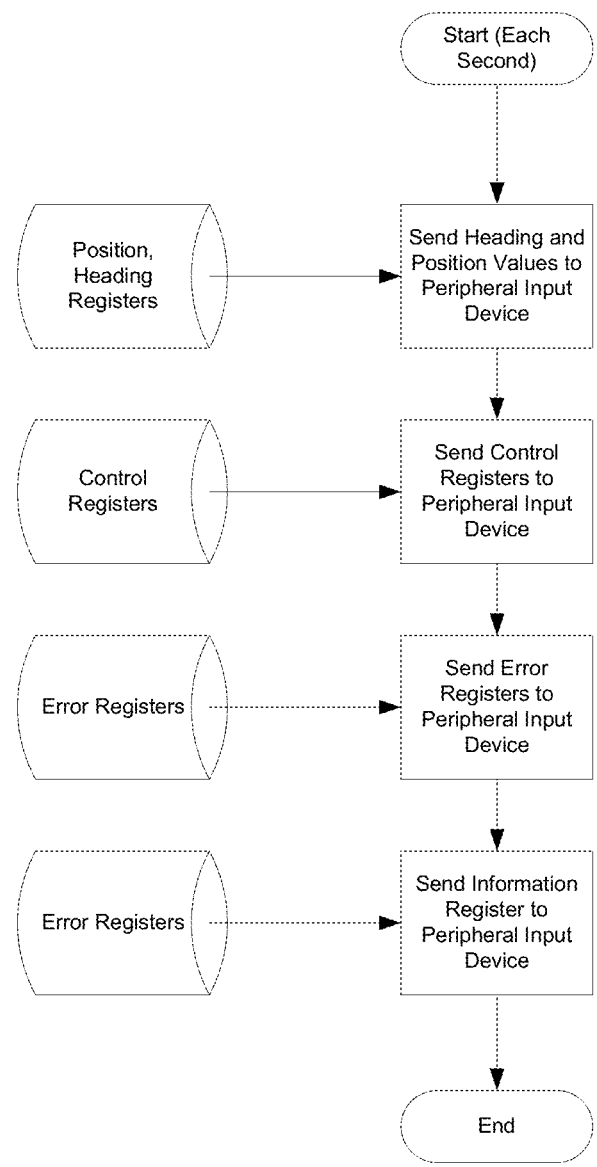

FIG. 17 describes the overall program architecture of the electronic controller of the preferred embodiment. While the software described herein is representation of method for the implementation of the overall system, other methods of implementation may be devised from both a global architecture and from individual routines. Within this controller embodiment, a routine initializes as shown in FIG. 18, then repeatedly loops as in FIG. 17. The electronic controller acquires commands from the peripheral input device, sensor data, and optionally alternative inputs such as the described foot-pedal control. The system then selects the motion control and speed algorithm, providing the control signals to the motor control part of the system, and provides feedback data as shown in FIG. 19 to the peripheral input device. Within this system, a series of data registers are available for storing the information relative to the control of the vessel. Upon start-up of the system, initialization is performed to enable the various sensors and to set up communication to the peripheral input device.

Figure 20:
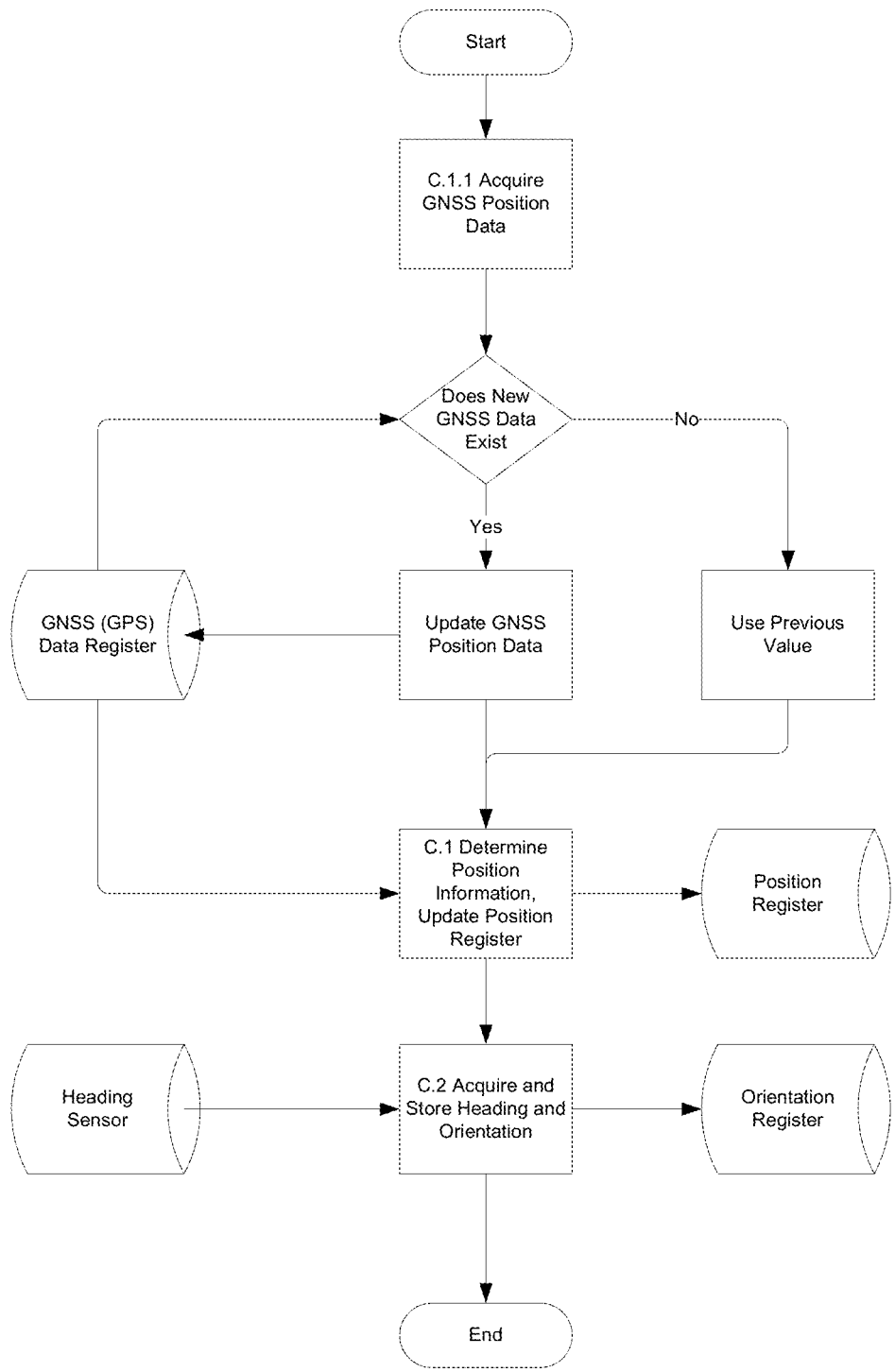
Figure 40:
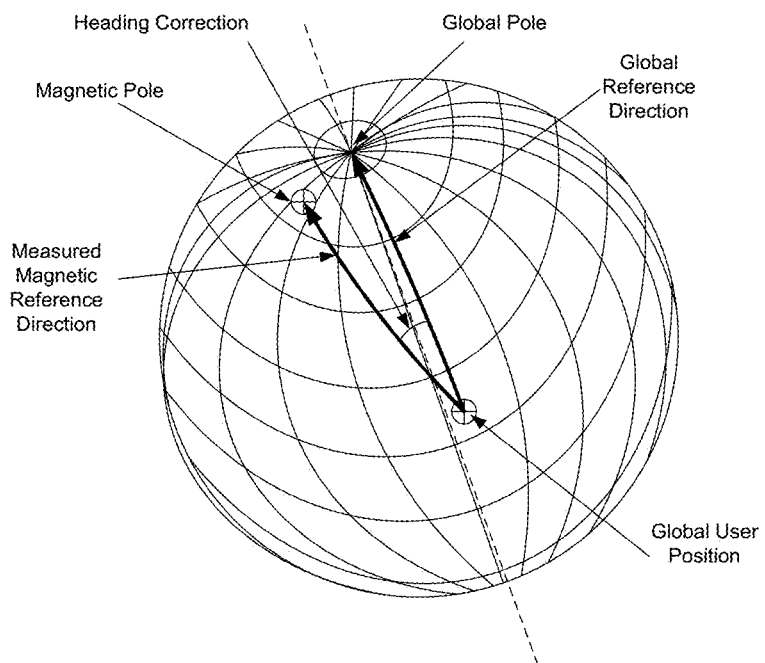
FIG. 40 illustrates graphically the algorithm utilized to correct the heading between the measured magnetic pole, and the global reference pole.

FIG. 20 describes the acquisition of sensor data of the preferred embodiment. Information acquired through use of commercially available sensors is decoded by the processor and placed into registers for global use by the algorithm. Position determination is acquired through the use of a GNSS receiver, and transmitted serially to the processor. The processor parses the information, and stores the received data in the position registers. The orientation is determined through use of the magnetic compass described herein. Due to the nature of magnetic heading sensing, the sensor may require calibration due to factors outside of the user's control. For use in the embodied algorithms, the position is based upon latitude and longitudinal coordinates, and the orientation is based upon the measured magnetic direction. The mapping direction for control desired to be calculated is relative to global direction based upon position of the controller on the globe. Due to the location of the magnetic pole not being fixed over the long term, and not being fixed at true north, the current location of the magnetic pole can be updated from the networked/web service, and an adjustment can be applied to the magnetic heading to give a global heading to the true north pole. A graphic example is shown in FIG. 40.

Figure 21:
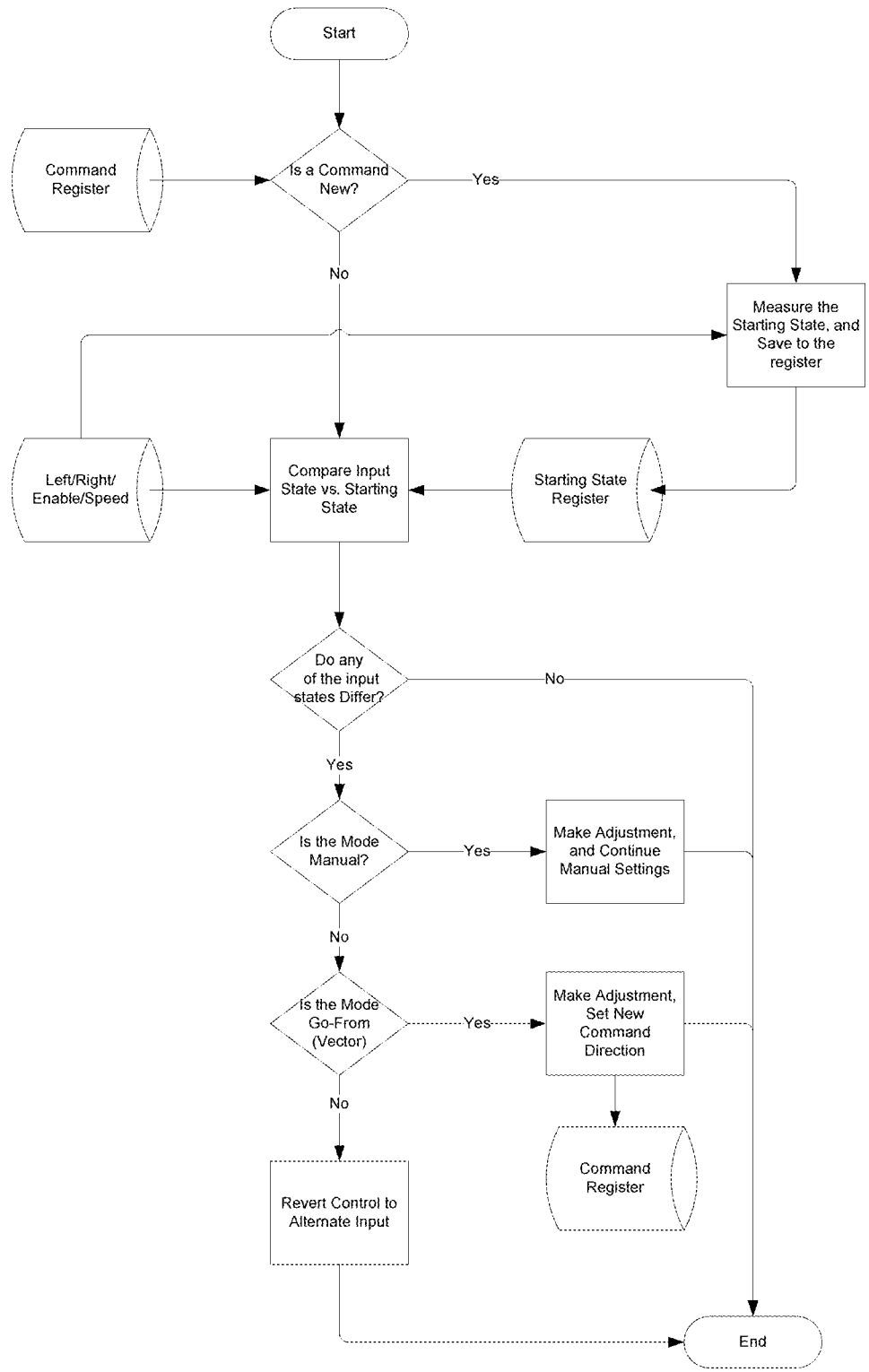

FIG. 21 describes the method for determining changes from the alternative input, such as a foot pedal, and describes how the system reads and interacts with the alternate input system. To achieve integrating the alternative input to the overall control system, an initial state of the alternative input is determined when a new control is actuated, and the state of the alternative input is monitored while under any of the modes of control.

Figure 22:
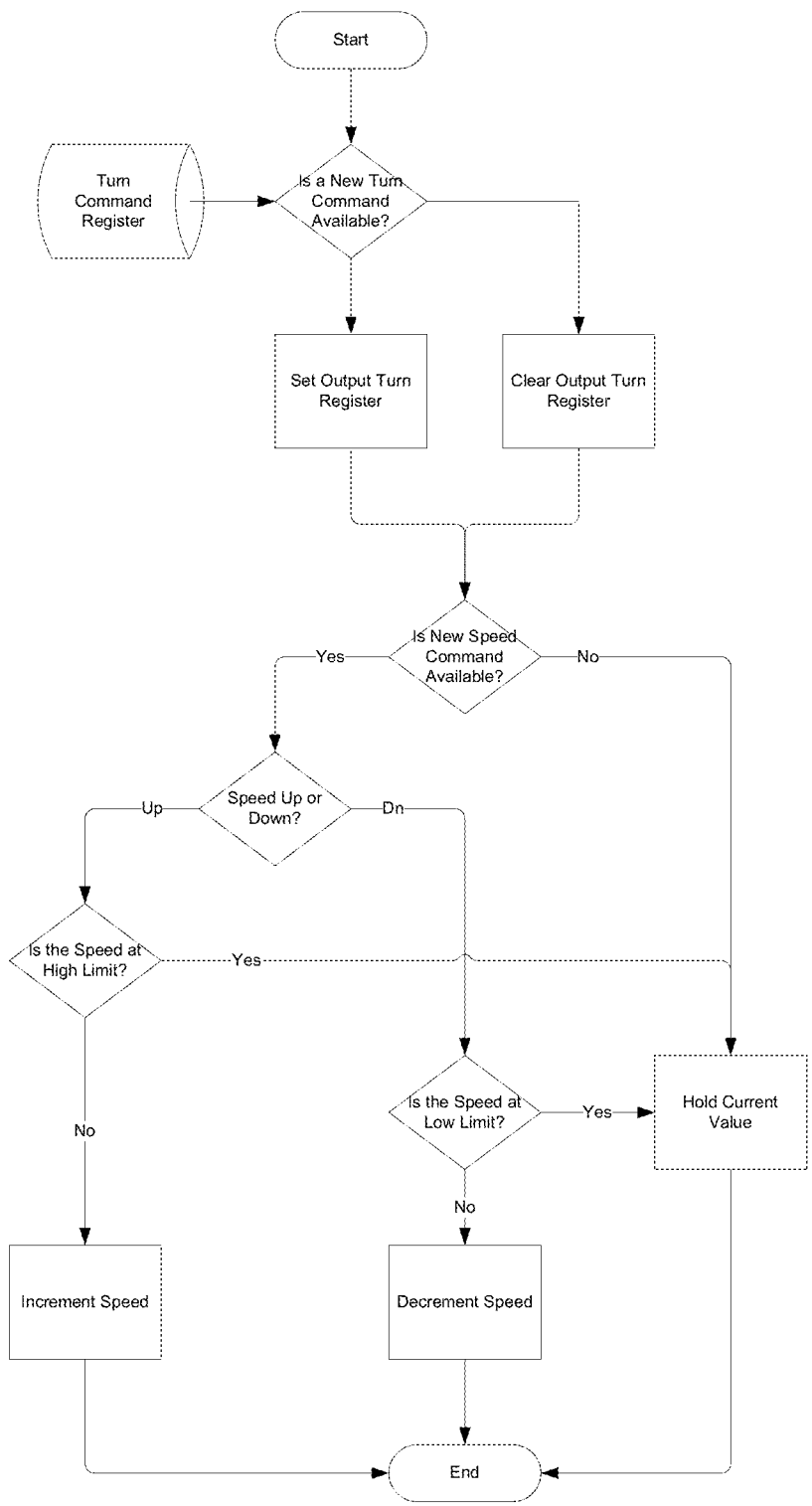

FIG. 22 describes operation for manual control. In order to enable this feature, inputs are received from the peripheral input device then processed to provide the output directly to the motor control system. To prevent out of range or impossible values for the motor controller, limits such as a maximum motor speed are imposed. The resulting signals are sent to the motor control, whether through discrete actuation of signals, by providing an analog level for the motor controller, or alternatively, through the use of a serial bus, and dedicated signals.

Figure 23:
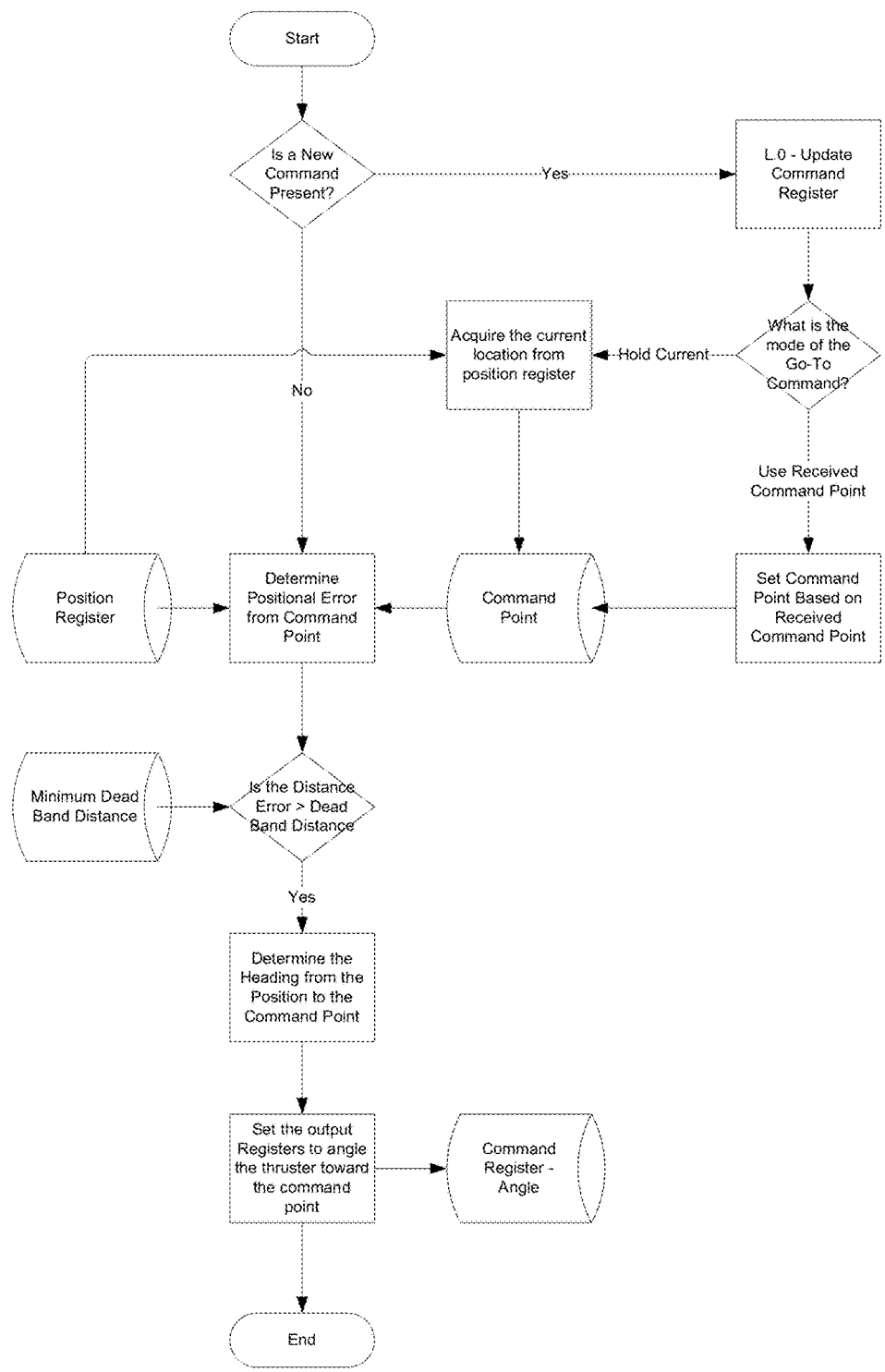

To enable the automatic motion control, two primary modes have been conceived to achieve the desired motion path for thruster angle, and the speed is varied depending on the selected mode of operation of the thruster (manual, anchor, vector, routes). Anchor control uses the Go-To algorithm, as described in FIG. 23, whereas Vector control uses the Go-From algorithm, as described in FIG. 24. When using a route of multiple points, the electronic controller is enabled to navigate from one to another by utilizing the Go-To and Go-From motion algorithms as described in FIG. 25.

Figure 37:
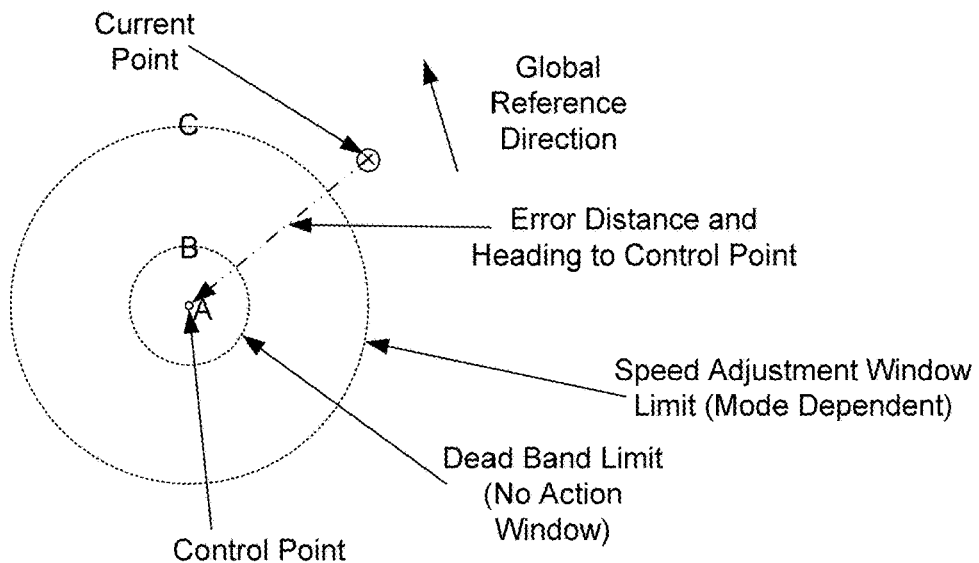
FIG. 37 illustrates graphically the algorithm utilized for the go-to function of the preferred embodiment of the present invention.

To further describe the go-to algorithm, the controller will first determine the go-to point, by either selecting the current point, or a defined point received from the peripheral input device. This point is then stored in the control register for navigation. The controller will then receive position data and perform error calculation from the control point, based on spherical distance on the earth, and heading calculated using the haversine formula. Based upon the error calculated, the controller will activate the thruster turn circuitry to point the motor thrust in the direction of the control point. FIG. 37 shows a graphic depiction of the control regions described in the software flow diagram of FIG. 23.

Figure 24:
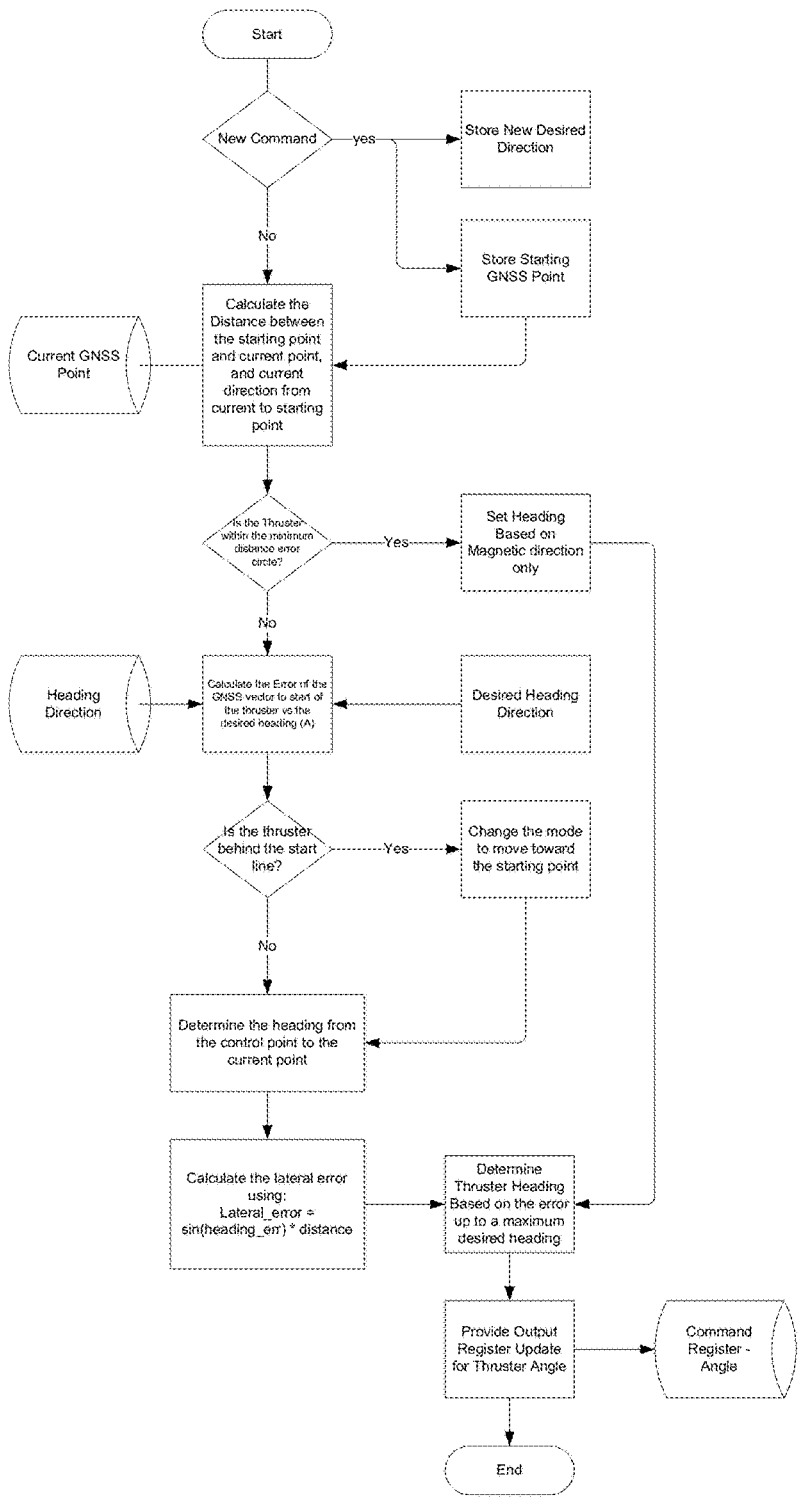
Figure 38:
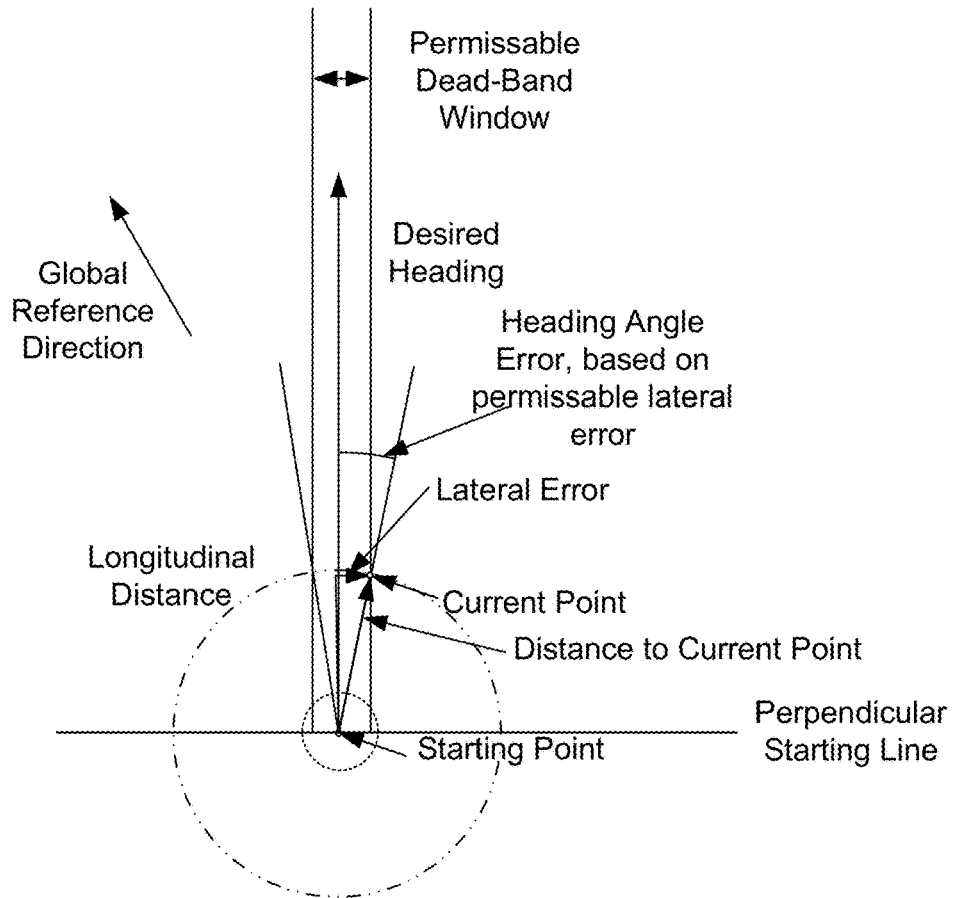
FIG. 38 illustrates graphically the algorithm utilized for the go-from function of the preferred embodiment of the present invention.

Describing further the go-from mode, the differences from the go-to mode must be understood. Whereas go-to utilizes a control point being targeted as moving toward (at any heading), the go-from mode, utilizes an initial point (control point), and utilizes a direction to be targeted to be moving in. This enables a few desirable control performance aspects. One, by moving away from a single point, multiple points along a straight path do not need to be calculated in order to track a particular direction. To achieve this result, the basic control parameters of the algorithm must be understood and described as to how they influence the control output. FIG. 24 describes the software flow of the algorithm, and FIG. 38 shows a graphic depicting the control from a particular control point. When the go-from mode is first enabled, the electronic controller determines its location, and stores in memory the control point or starting point. The controller then directs the thruster in the control/desired direction and calculates the positional difference between the control point and the currently sensed position from GNSS. As a part of the control algorithm, a dead-band around the desired heading is established, the lateral error is calculated, and the electronic controller calculates where it is relative to the desired heading based upon a trigonometric calculation. Of the parameters available, knowing the distance between the control point and the current point, the heading angle from the control to the current point, and the desired heading angle, the electronic controller can calculate the lateral error, by using a sine function, where (lateral error)=sine(desired—actual heading)*(distance from control to current point). A few things must be appreciated to realize the relationships between the control parameters. As the distance grows very large, the heading angle error becomes very small for the same lateral error. At small distances, it should be noted that the angle will change very quickly relative to position change. This is addressed by utilizing the dead-band width, and when the system is within this range, the electronic controller reverts to using only the electronic compass until the controller is outside of this window.

Figure 25:
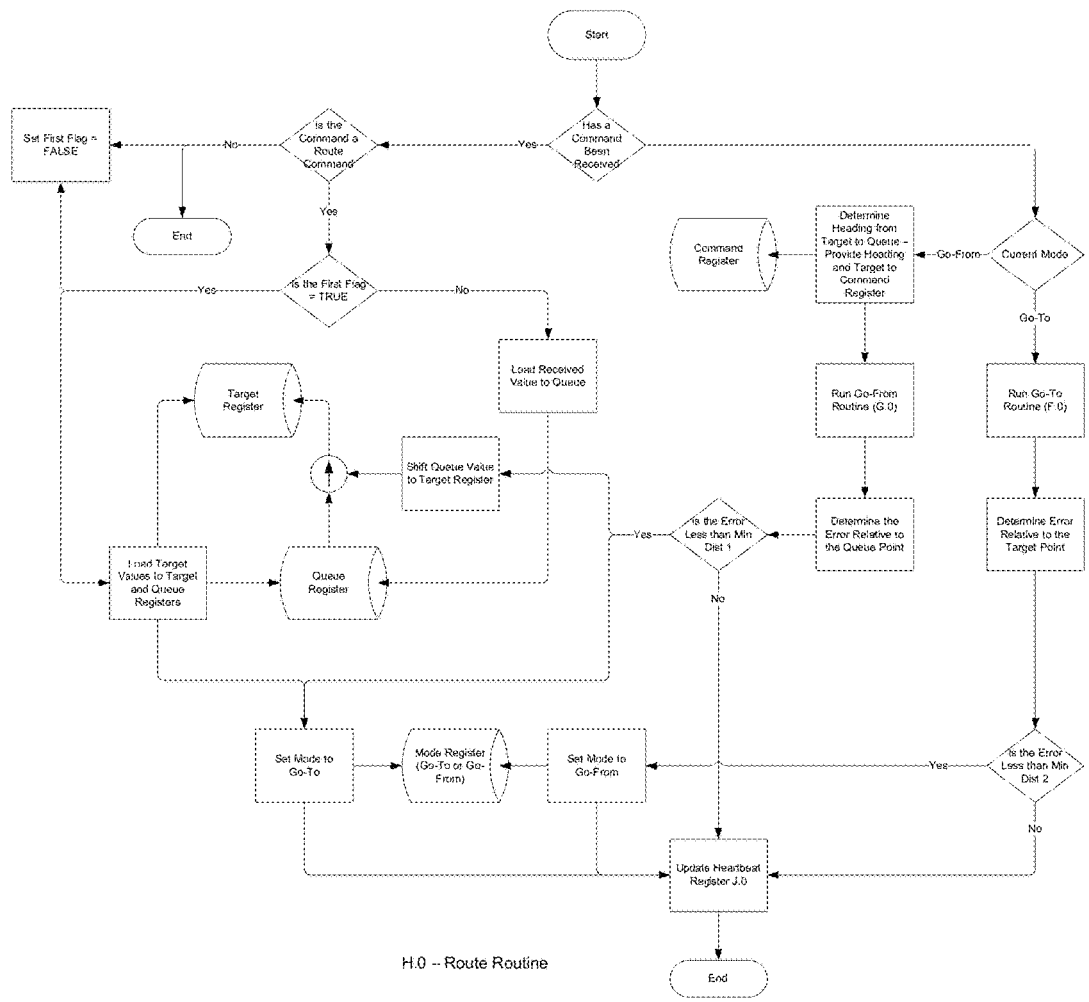
Figure 26:
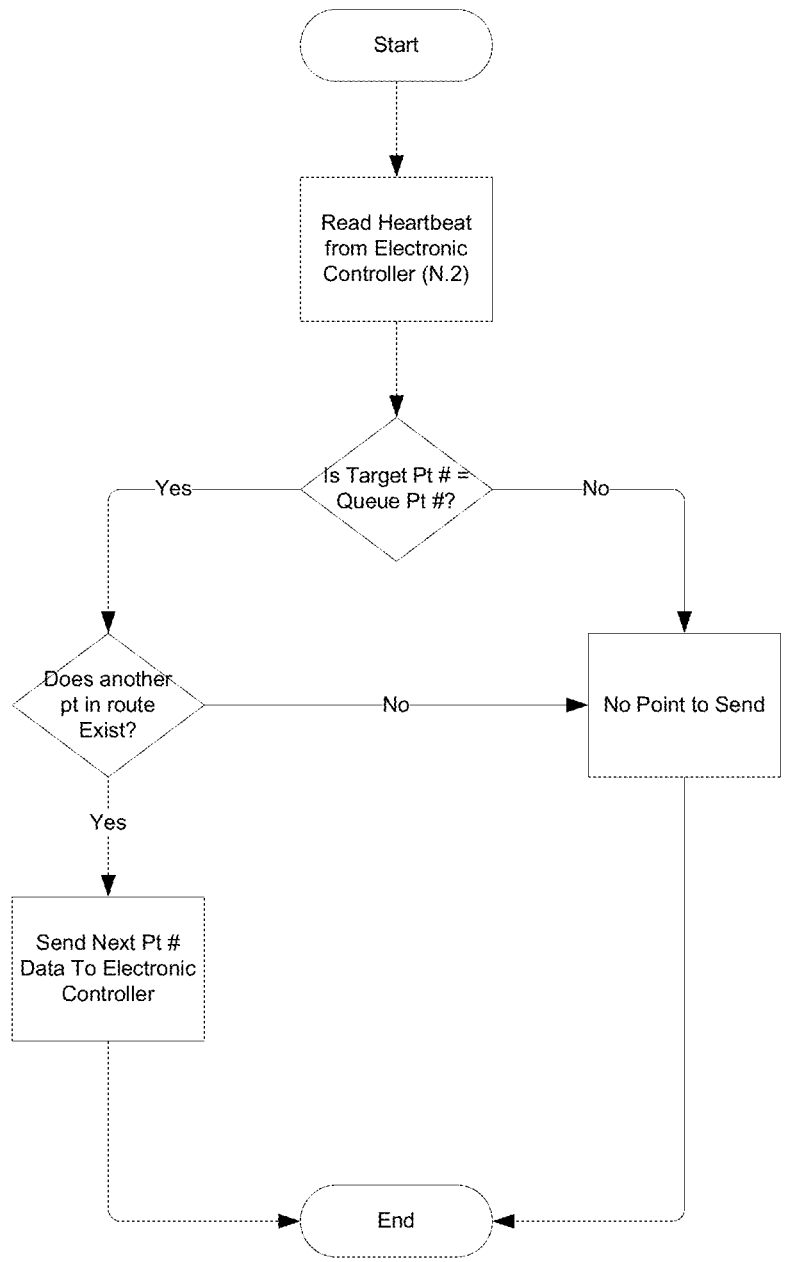
Figure 39:
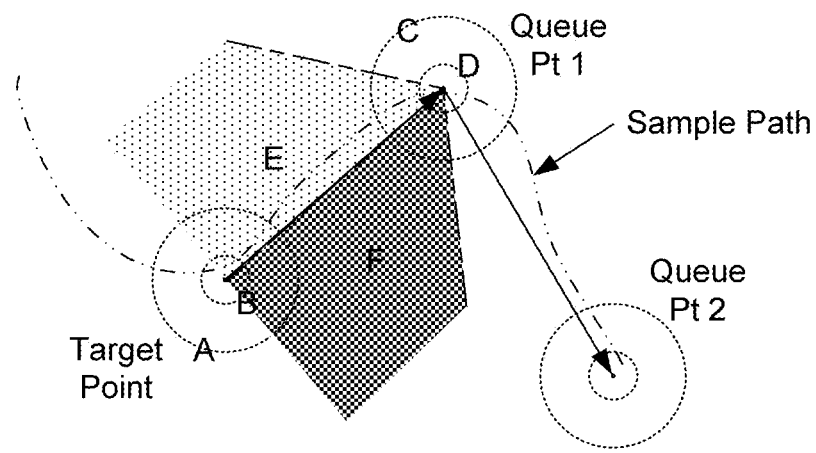
FIG. 39 illustrates graphically the algorithm utilized for the routing through points function of the preferred embodiment of the present invention

FIGS. 25 and 26 show the software flow of the routing mode, and FIG. 39 shows a graphical depiction of navigating a route. To implement a route in the described control system, it is desirable to minimize the data required to be stored in the control system. This allows for longer routes (more points) since the control system can access the points on a device having much higher capability. An example is the peripheral input device when in the form of a smartphone or a tablet computer. To describe the parameters of interest in the controller, the target point is described as the point which the controller is actively using for control. The queued point is described as the next point in the route, and the second queued point is the point thereafter. Each point in a route has a sequential unique number associated with it. Each point has associated with it a region surrounding it at which the control system will make adjustments and which determine the mode for which the controller operates. To implement the control system, the peripheral input device sends a command to start a route, and provides the first point for control. The electronic controller begins navigation to this point using the go-to function, and broadcasts to the peripheral input device the control point, and the queued point, which is established on the first run as the same as the control point. The application running on the peripheral input device reads the control and queued points, and when they are detected as being equal, will send the next point, setting it up in the queue. To transfer control to a different point, the electronic controller detects the position relative to a control point, and changes modes. When approaching a point, the controller will change to go-to mode, and navigate to the point. Once the point is reached, noted by a minimum distance to achieve, the controller switches modes to go-from, and calculates a desired heading based on the heading between the control point reached, and the next point in the route. The controller then navigates using the go-from setting, until it reaches a threshold, either a distance from a point, or by crossing a threshold line calculated by determining the heading from the queued point to the current location. Once the threshold is reached, the controller increments the control point to being the queued point, and changes mode to go-to, if within the threshold distance (circle C), or on the outside of the curve (shown as region E), If in region F, the controller would switch to go-from mode and navigate toward the subsequent point. This process then repeats for all points in the route. At the end of the route, the control system would stop navigation, and indicate to the user that the route has been completed.

Figure 27:
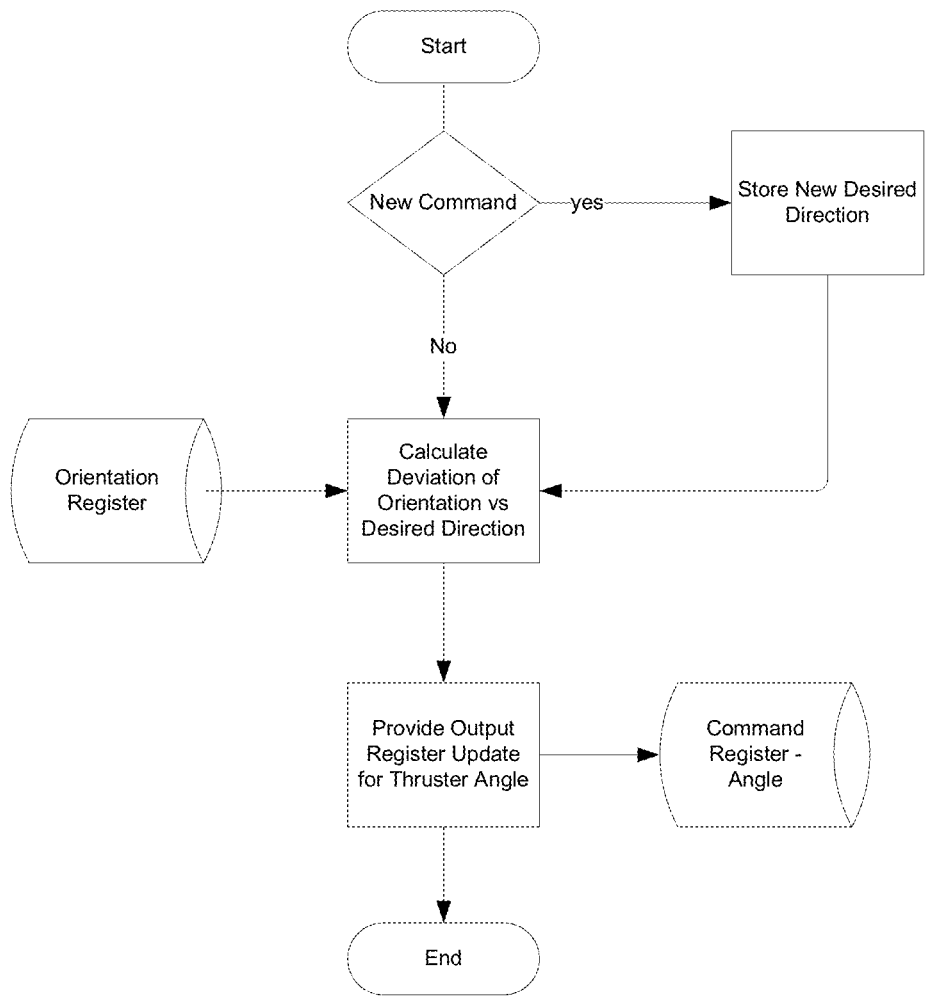
Figure 28:
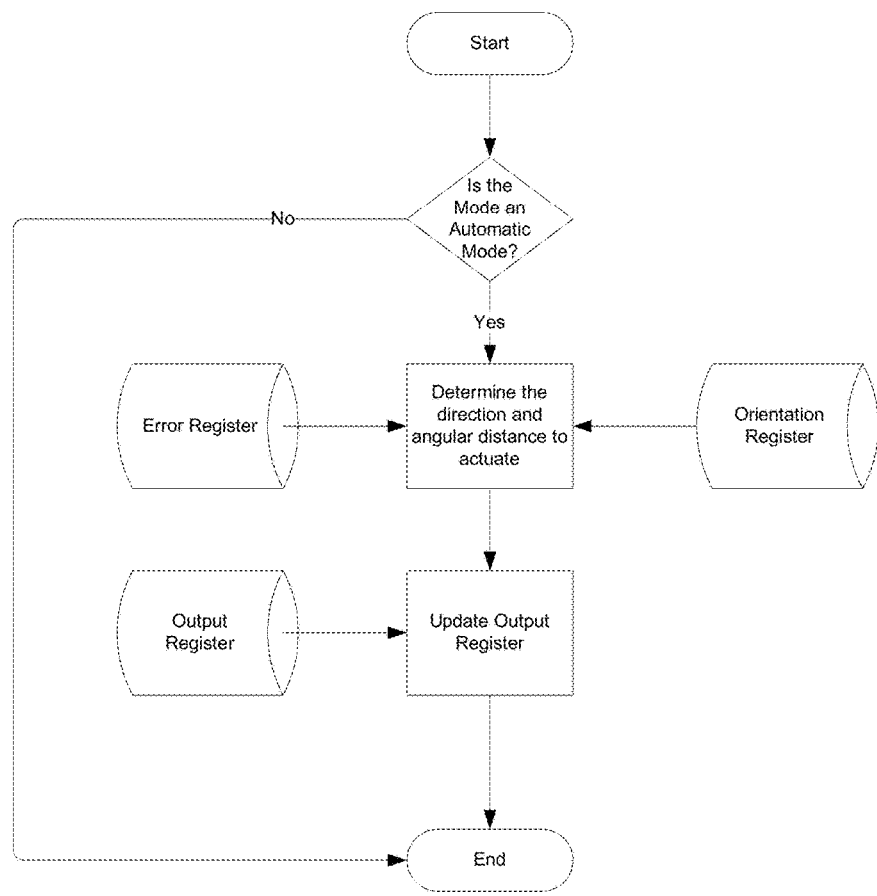
Figure 28B:
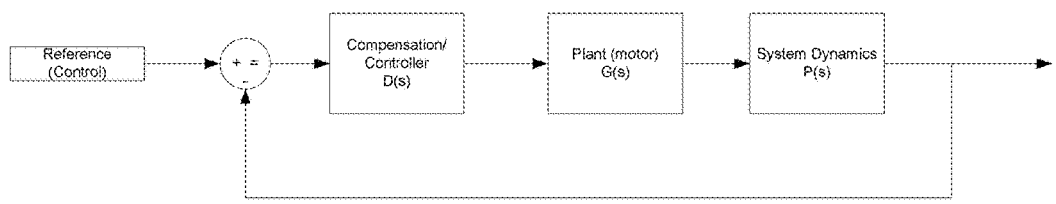

In addition to providing a vectored direction, as is provided in the go-from mode of operation, a function to hold a particular direction of the thruster is also implemented, as is shown in FIG. 27. This will enable the user to hold a heading for the thruster, and allow external influence of wind, waves and currents to permit drift in the direction held.

Figure 29:
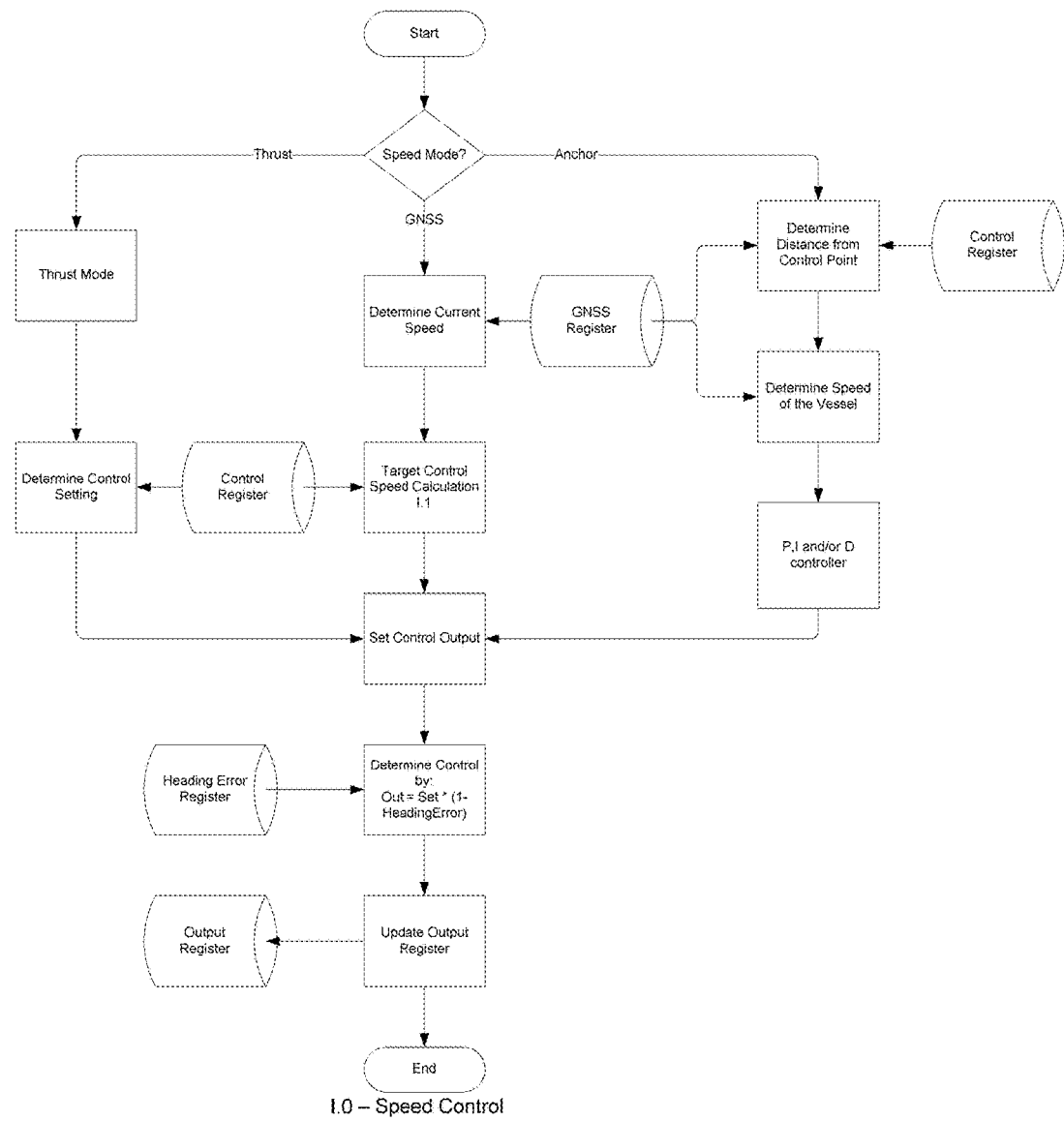
Figure 29B:
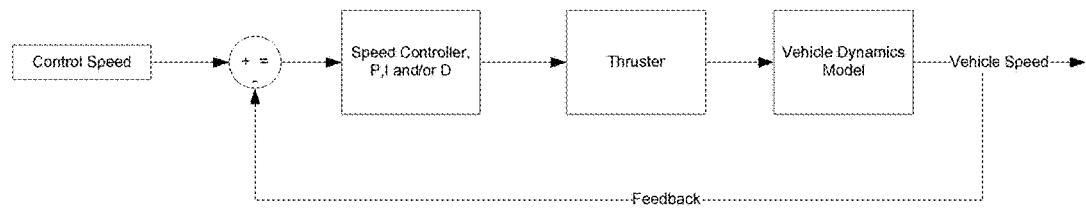

FIGS. 29 and 29B describe the speed control. Because of the several modes using the go-to and go-from control algorithms, different speed profiles may be desired for different uses. For instance, as can be seen in the anchor mode of the application, the go-to algorithm is used, and the speed control is performed to stop the vessel once in the window. Alternatively, the routes mode will also utilize the go-to algorithm, however, will maintain a speed through the point, shifting modes once the point has been reached. For this application, 3 modes of operation for speed are desired. In one, the speed control is performed by setting the thrust. In the second, the speed is set based upon an anchoring point. In the third, the speed is controlled based upon feedback from the GNSS system. In this mode, the error is calculated and a control signal is generated based upon controller gain settings. In one form, a proportional control is used, where the changes to the control signal are proportional to the speed error. In a dynamic system such as a boat with the steerable thruster, this may not be sufficient, as the momentum of the boat can cause the control system to overshoot the target point. To address these shortcomings, additional gain parameters can be introduced. This may include integral control, which will accumulate error, and increase the accordingly. For example, if low velocity error has existed for a period of time, the integral controller will increase the thrusting output to compensate, thus reducing the error by increasing the speed. Additionally, derivative control can be implemented, which will calculate the changes to the error, and with rapid changes, will produce a control signal accordingly. For example, if the speed is increasing quickly, an overshoot of the speed target may be imminent due to inertia in the system. To compensate, derivative control can be used to reduce the control, and thus slow down the speed increase. These additional gains are desired to prevent overshoot of the control, as well as prevent oscillations in the system. In the system, a control speed is calculated based upon the thrust in the expected direction. In some cases, the thruster has not yet achieved the desired heading, and thrust contrary to that heading may cause instability in the system leading to oscillations and turn overshoot. To compensate for this, the control speed is reduced relative to the thruster angular error and control mode. An example of this would be where the speed is reduced to no thrust at 90 degrees to the target direction, and is increased to 100 percent thrust to be maintained within a dead band surrounding the target direction.

Figure 30:
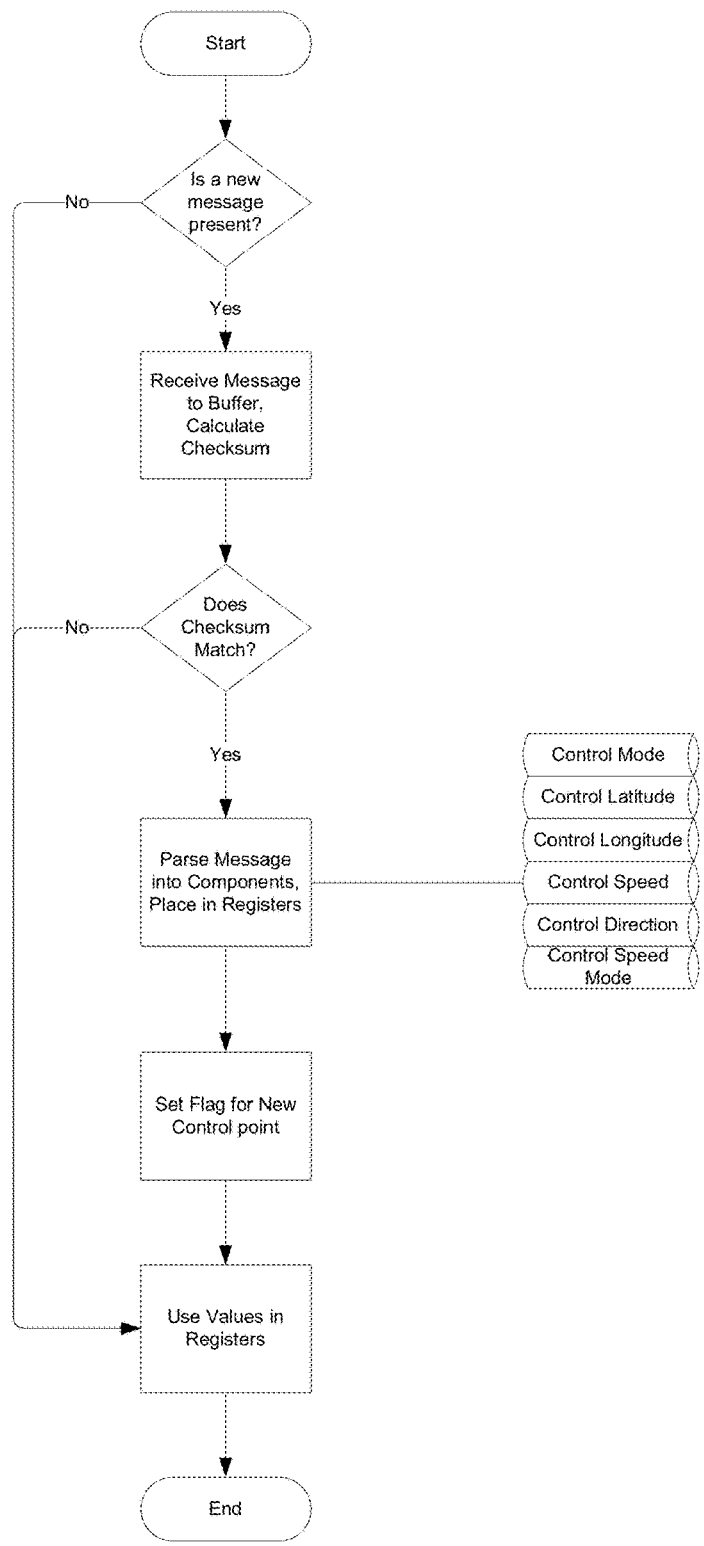

A strong connection between the peripheral input device and the electronic controller ensures integrity of the link. FIG. 30 describes the receive command of the electronic controller. New messages are not received continuously because the architecture uses the last known command, thus the electronic controller only parses a command when there is a new message present from the peripheral input device. Once it is recognized that a message is present, the message is stored to a buffer, and a checksum or hashing operation is performed. The calculated value is then compared against the received checksum or hashing value and determined whether the message that has been received is valid. Once determined to be valid, the message is parsed into its components, including one or more of the following: control mode, target latitude, target longitude, target speed, target direction and control speed mode. The controller then provides a flag to the system that a new message is present, and to act on it. For example, if an anchor is commanded, the electronic controller would save the current latitude and longitude to the command register, and would begin controlling the go-to function to the command point, and the speed control function to the anchor mode.

Figure 31:
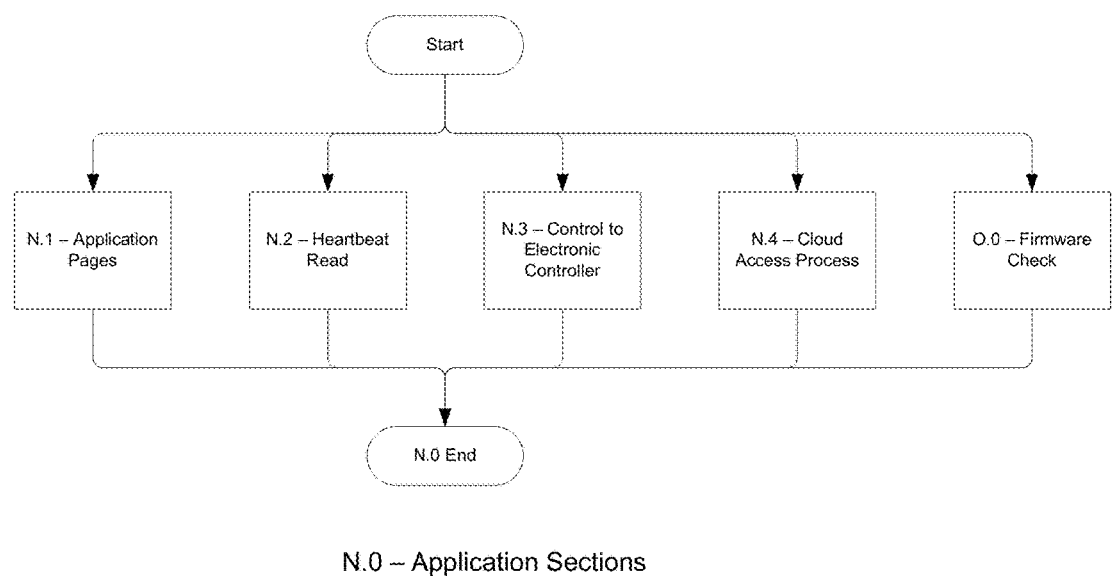
FIG. 31 illustrates the mobile application software flow diagram for the main application function of the preferred embodiment of the present invention.
Figure 32:
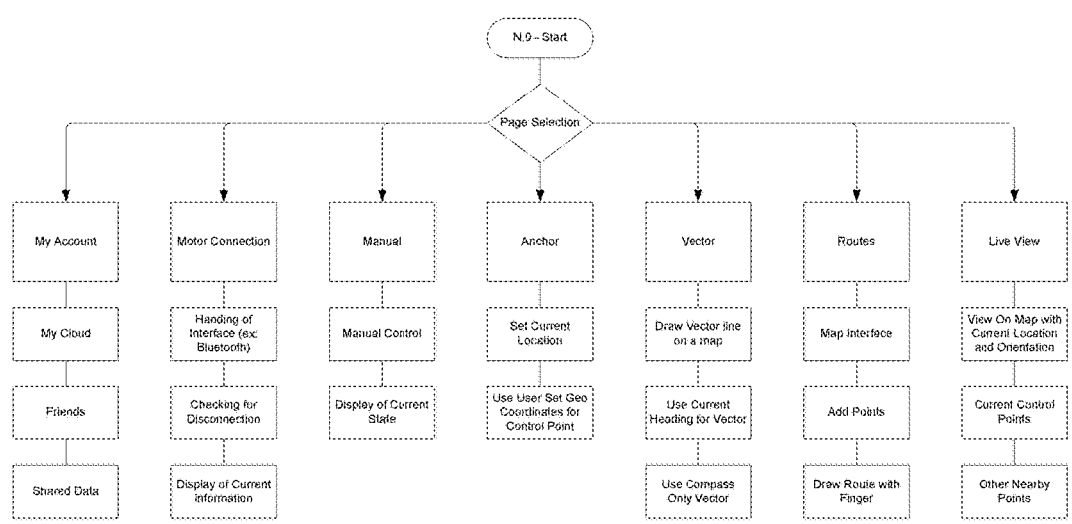
FIG. 32 illustrates the mobile application software application pages for the main application of the preferred embodiment of the present invention.
Figure 33A:
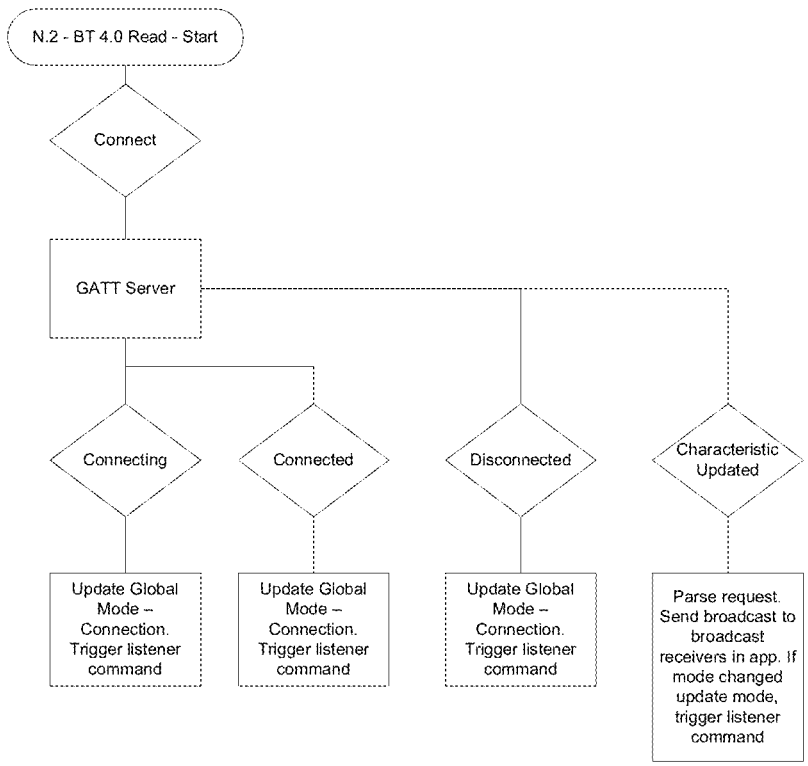
FIG. 33A, FIG. 33B, FIG. 33C and FIG. 33D illustrate the methodology to implement communication in the mobile application to the electronic controller of the preferred embodiment of the present invention.
Figure 33B:
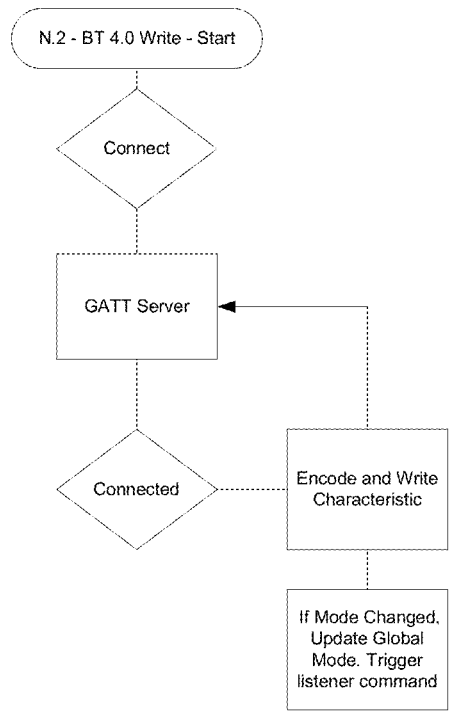
Figure 33C:
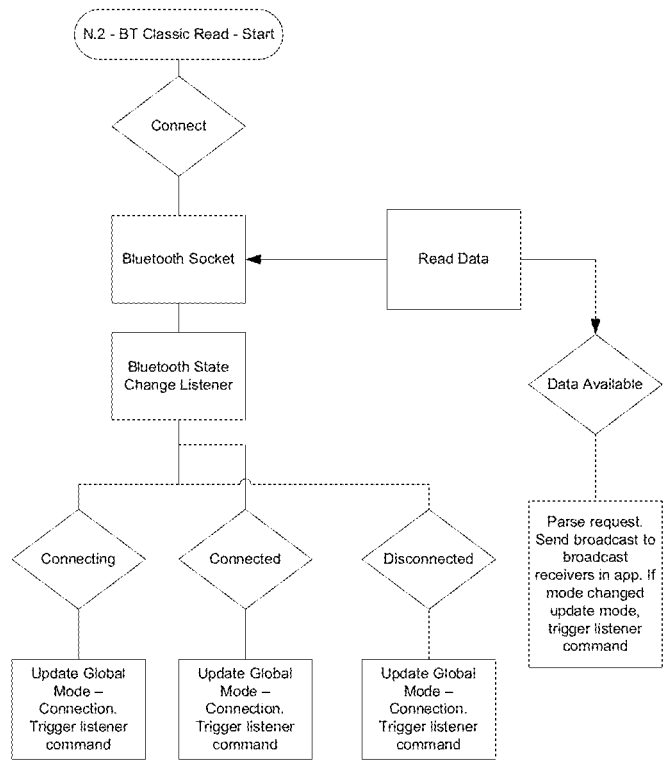
Figure 33D:
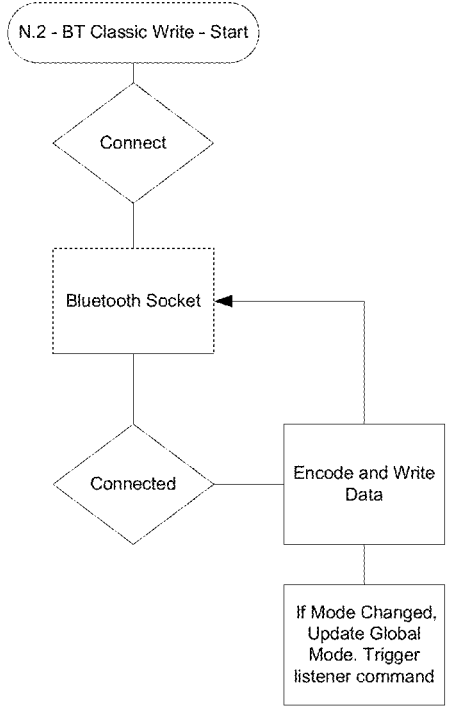

As a separate software routine from the electronic controller, the application running on the peripheral input device performs a specified set of tasks in order to enable the invention disclosed. In the preferred embodiment, this is an application running on a smartphone or tablet computer. FIG. 31 shows the high level program sections for the application, which perform the tasks of the peripheral input device, and FIG. 32 shows the included functions on each of the specific pages of the application, which are shown in FIG. 6 through FIG. 10.

Figure 34:
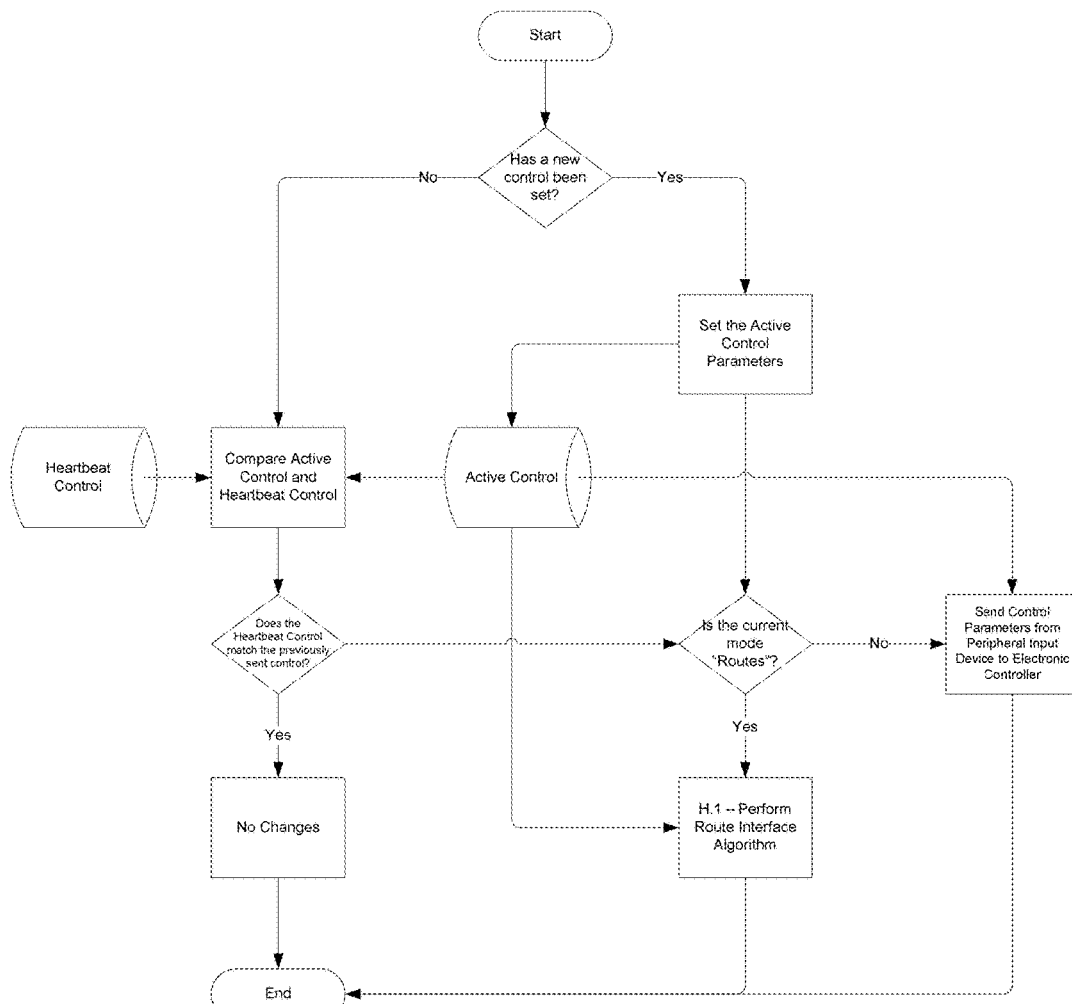
FIG. 34 illustrates the mobile application software algorithm to implement communicating control signals to the electronic controller.

To implement control, a communication medium is required. In the preferred embodiment shown, Bluetooth communication was established to accomplish this task for the communication technology, of which four modes of operation are shown in FIGS. 33A, 33B, 33C and 33D, illustrating multiple types of communication strategy (Bluetooth 2.1 versus Bluetooth 4.0). In addition to the physical layer of Bluetooth communication, a strategy for control from the application to the electronic controller is implemented, and shown in FIG. 34. This strategy utilizes the feedback from the electronic controller through the use of its heartbeat, and continues to send the command message until the desired mode of operation is implemented, and broadcast to the peripheral input device.

Figure 35:
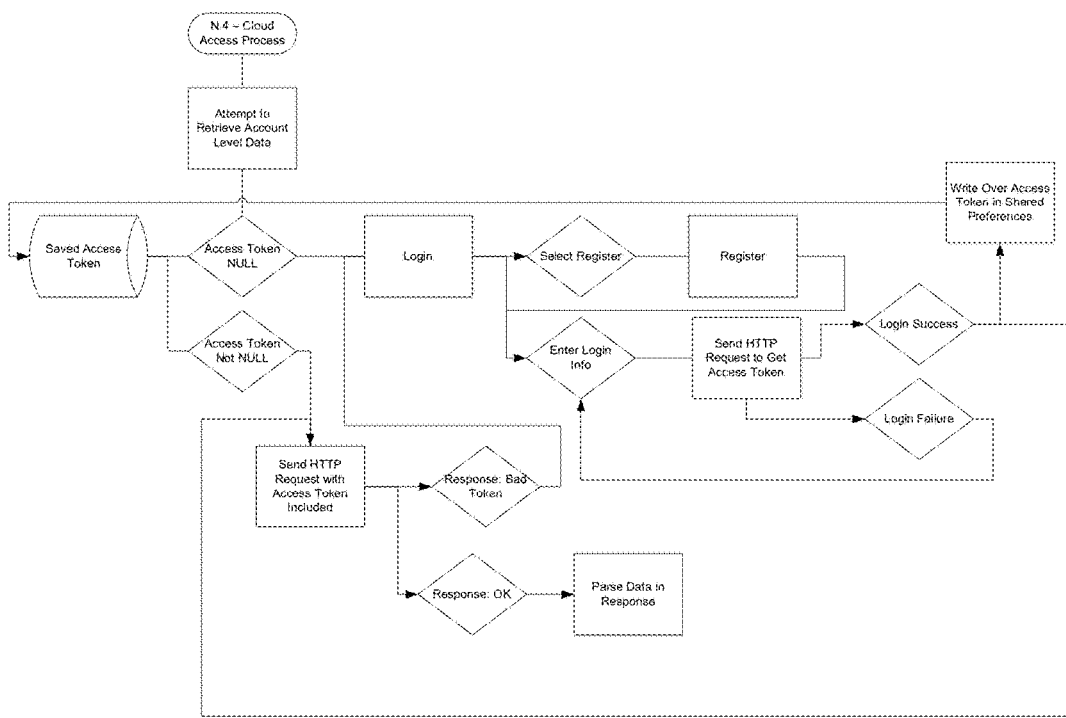
FIG. 35 illustrates the mobile application software algorithm to access network or cloud data of the preferred embodiment of the present invention.

To implement the sharing aspects of the device, a method to read and write to an online database was developed, and is described in FIG. 35. This method utilizes a token system and a login to gain secure access to a user's cloud network information. To transfer data an HTTP request is used to transport the information from the cloud to the user, and vice-versa.

Figure 36:
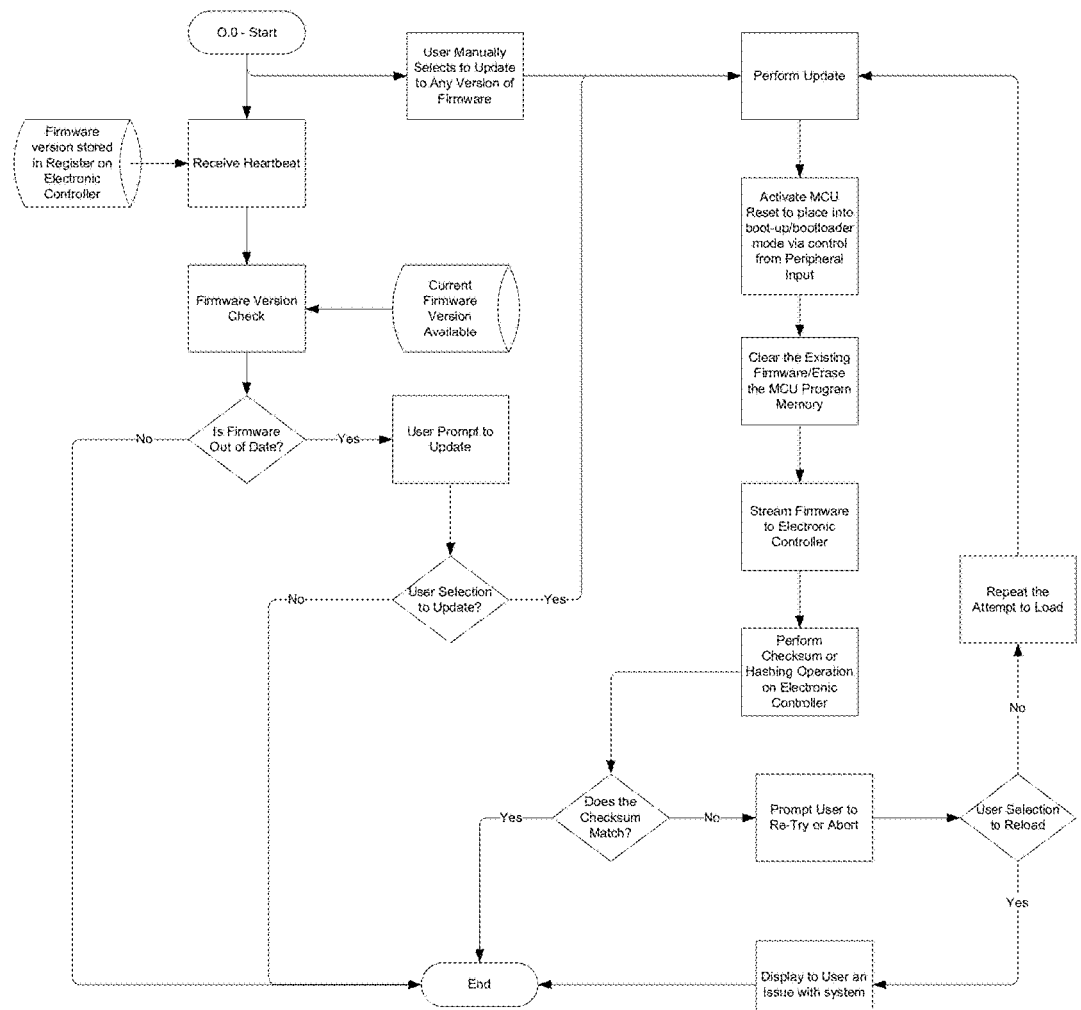
FIG. 36 illustrates the mobile application and electronic controller software flow diagram of firmware updates of the preferred embodiment of the present invention.

With the connection to a global network, the ability to upgrade the application is possible, and additionally, a method can be utilized to upgrade the firmware of the electronic controller, which can now be enabled as an interface connection is available. FIG. 36 illustrates this capability, and a method to implement, by use of the Bluetooth connection in the preferred embodiment. The system can be configured to automatically determine whether the firmware is up-to-date by comparison of the version numbers with the current release of firmware, or manually selected to update the firmware. The ability to update firmware is most desirable, as this allows changes to the algorithms, refinement of gains, and fixing of software bugs all while the electronic controller is in its installed location.

Methods for use or operation of the system may be manifested in a variety of forms drawing from the numerous disclosures and alternative disclosures described herein. Steps within a particular method example may be reordered. One example of a method for use of one embodiment of the control system is now described. The method comprises the steps of the user establishing a form of control application described herein on a smartphone or tablet as previously disclosed. A connection between the smartphone and the electronic controller is established wirelessly, and the user may provide manual inputs in the application, actuating for example a turn command, or increasing the speed of the thruster. The user may then achieve a desired location for fishing, and actuate the anchor function in the application of the control system. The electronic controller would operate in the go-to command state, and anchor speed mode. The electronic controller would automatically maintain the global position, based on the GNSS data from the position sensor, and when adjustment is needed, use the direction device to direct the thrust in the proper direction. The outputs to the thruster would be actuated to provide the proper heading and thrust level to maintain the control parameters.

Another example of a method the user may use is creation of a route. For this application, creation of the route is aided by the use of maps or chart-plotting capabilities. When a network exists, the user would navigate the maps, which would be downloaded as they are being used for reference navigation. If a network were not available, the user may have maps locally cached, by pre-planning their trip, and obtaining the specific geographic areas being used. Once control data has been established for the route, the user would commence the route, and the electronic controller and peripheral input device would provide the automatic navigation. To achieve the navigation, the electronic controller indicates the points at which it is controlling to, and the peripheral input device monitors. When a control point has been reached, the peripheral input device would send the next point in the route for navigation control.

In the above methods, the user may find the anchor location favorable, or the route productive, and may save the control point. The saving would occur locally, when no network exists, and when a network exists, it would also sync the control point information to a cloud network server. With the data in a cloud location, the user may analyze the information at a later time, or, may send the information to another user, by providing the second user a key to obtain the information.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A method for accessing internet based mapping data to support automated marine navigation of a vessel comprising the steps of:
   establishing a wireless network communication between a smartphone located on the vessel and the global internet network;
   starting a mobile controller application on said smartphone;
   loading mapping data into memory of the smartphone for use by said mobile controller application on said smartphone from at least one or more of: a) an internet network source; and b); from cached mapped data retrieved from the internet; and c); internet network mapping data sources displayed on a display of said smartphone;
   establishing communication between said smartphone on the vessel and an electronic controller disposed on a thruster on the vessel;
   establishing location of the vessel based on data from a position device located within said electronic controller;
   establishing direction based on data from a direction device located within said electronic controller;
   overlaying the loaded mapping data from said smartphone having at least one or more waypoints and routes using one or more of: a) actual logged GPS waypoint and route data; and b); new waypoint data entry; and c); at least one or more third party internet network waypoint and route data locally stored; and d); at least one or more third party internet network waypoint and route data downloaded from the global internet network; and e); other global internet network based waypoint or route data sources;
   utilizing a display on the smartphone to reference at least one of waypoint and route data and utilizing a processor on the smartphone to compile control input data;
   utilizing the control system GNSS device location data and data received from the direction device to provide control feedback for navigating one or more of a route and a waypoint;
   sending said routing data compiled by said mobile controller application from said smartphone to said electronic controller;
   establishing wired communication between said electronic controller and a steerable thruster device;
   sending control signals from said electronic controller to said steerable thruster device;
   wherein said control signals from said electronic controller controls direction and magnitude of said steerable thruster device for causing a vessel to move according to said one or more waypoints, directions and route data.

2. The method of claim 1 wherein map information for creation of one or more of route and waypoint data originates on the global internet network and is displayed on said smartphone.

3. The method of claim 1 wherein map information for creation of one or more of route and waypoint data originated from the internet network and is from one or more of a cached and a locally stored data source on said smartphone.

4. A method of retrieving or creating waypoint or route data comprising the steps of:
establishing a wireless network communication between a smart phone and the global internet network;
starting a mobile controller application on said smartphone;
said smartphone located on a vessel;
loading mapping data into memory of said smartphone for use by said mobile controller application on said smartphone located on said vessel from one or more of: a) a global internet network source-; and b); from previous global internet network cached mapped data; and c); from other global internet network mapping data sources;
overlaying the loaded mapping data from said smartphone with a least one waypoint or route according to one or more of; a); actual logged GPS waypoint and route data; and b); new waypoint data entry; and c); third party waypoint or route data locally stored or downloaded from the global internet network; and d); other global internet network based waypoint or route data sources;
generating at least one waypoint or route in the mobile controller application;
utilizing said smartphone to reference at least one or more of waypoint and route data to compile control input data;
establishing communication between said smartphone located on said vessel and an electronic controller located on the same vessel;
utilizing the control system GNSS device location data obtained from a direction device located within said electronic controller disposed on a thruster on the vessel, and data received from a direction device located within said electronic controller to provide control feedback for navigating a route or navigating to a waypoint;
sending said routing data compiled by said mobile controller application from said smart phone to said electronic controller;
establishing wired communication between said electronic controller and a steerable thruster device;
sending control signals from said electronic controller to said steerable thruster device;
wherein said control signals from said electronic controller controls direction and magnitude of said thrusting device causing the vessel to move according to said one or more waypoint, directions, and route data.

5. The method of generating a waypoint or route of claim 4 wherein the waypoint or route is generated using sensed position data further comprising the step of navigating to one or more waypoints and concurrently logging GPS points as waypoint and route data.

6. The method of generating a waypoint or route of claim 4 wherein the new waypoint or route is created on said smartphone.

7. The method of generating a waypoint or route data of claim 4 wherein the waypoint or route is generated from a data set retrieved to memory on said smartphone by the user from an internet source.

8. The method of generating a waypoint or route data of claim 4 wherein the waypoint or route is generated from a data set stored locally on said smartphone.

9. The method of retrieving waypoint or route data of claim 4 wherein previously saved third party waypoint or route data is downloaded to said smartphone from one of: a) a locally stored data source; and b); wirelessly from an internet source.

10. A method of sharing a dataset of one or more waypoints to support automated marine navigation comprising the steps of:
establishing a wireless network communication between a smartphone located on a vessel and the internet;
starting a mobile controller application on said smartphone;
generating at least one or more of waypoint and route data sets on said smartphone;
upload syncing the at least one waypoint and route dataset located on said smartphone to the global internet network;
providing authorized access to the at least one waypoint and route data set;
utilizing said smartphone to reference said at least one waypoint and route data set and compiling a control input data set using a processor in said smartphone;
utilizing control system GNSS device location data and data received from a direction device located within an electronic controller to provide control feedback for navigating at least one of a route and waypoint;
sending said route data set compiled by said controller application from said smartphone located on a vessel to said electronic controller disposed on a thruster on a vessel;
establishing communication between the electronic controller and a steerable thruster device;
sending control signals from said electronic controller to the steerable thruster device;
wherein said control signals from said electronic controller controls direction and magnitude of the thrusting device causing the vessel to move according to at least one of said waypoint, directions, and route dataset.

11. The methods of claim 10 wherein the step of providing authorized access further comprises the step of providing the data set on multiple devices connected through the authorized access by the same user.

12. The methods of claim 10 wherein the step of providing authorized access further comprises the step of providing at least one or more waypoint and route dataset to one or more other user on unique or multiple devices connected through the authorized access.

13. The methods of claim 10 further comprising the step of sharing the at least one waypoint or route data set through use of a universal or custom electronic file format.

14. The methods of claim 10 further comprising the step of sharing the at least one waypoint or route data set through an authorized internet database.

15. The methods of sharing waypoint or route data of claim 10 further comprising the step of directing said mobile controller application to control a steerable thrusting device vessel to one or more of the downloaded shared waypoints and route data sets.

16. A method for accessing internet based data to support automated marine navigation of a vessel comprising the steps of:
establishing with a smartphone a wireless network communication to the global internet network;
starting a mobile controller application on said smartphone located on a marine vessel;
loading mapping data into said mobile controller application on said smartphone located on said marine vessel from at least one or more of: a) a global internet network source; and b); from cached mapped data retrieved from the internet;

and c); global internet network mapping data sources;

establishing communication from said smartphone to an electronic controller located on said marine vessel;

establishing location of the marine vessel based on data from a position device located on an electronic controller disposed on a thruster of the vessel;

establishing direction based on data from a direction device located on said electronic controller;

utilizing at least one or more waypoints or routes using one or more of: a) actual logged GPS waypoint and route data; and b); new waypoint data entered by the user; and c); at least one or more third party global internet network waypoint and route data locally stored; and d); at least one or more third party global internet network waypoint and route data downloaded from the global internet network; and e); other global internet network based waypoint or route data sources;

referencing on a display on said smartphone at least one of waypoint and route data to compile control input data on a processor on said smartphone;

utilizing the control system GNSS device location data and data received from the direction device located on said electronic controller to provide control feedback for navigating one or more of a route and a waypoint;

sending said routing data compiled by said controller application to said electronic controller;

establishing wired communication between said electronic controller and a steerable thruster device;

sending control signals from said electronic controller to said steerable thruster device;

wherein said control signals from said electronic controller controls direction and magnitude of said steerable thruster device for causing a vessel to move according to said one or more waypoints, directions and route data.

* * * * *